United States Patent
Todt et al.

(10) Patent No.: US 8,883,284 B2
(45) Date of Patent: Nov. 11, 2014

(54) VAPOR PERMEABLE FABRIC CONSTRUCTS WITH STATIC OR DYNAMIC ANTIMICROBIAL COMPOSITIONS

(75) Inventors: Gregory L. Todt, Union, MI (US); Seckin Ozol, South Bend, IN (US); Rajesh Hemendra Shah, Lexington, MA (US)

(73) Assignee: Transhield Technology AS (NO)

( * ) Notice: Subject to any disclaimer, the term of this patent is extended or adjusted under 35 U.S.C. 154(b) by 0 days.

(21) Appl. No.: 13/418,522

(22) Filed: Mar. 13, 2012

(65) Prior Publication Data

US 2012/0171409 A1 Jul. 5, 2012

Related U.S. Application Data

(63) Continuation-in-part of application No. 12/875,870, filed on Sep. 3, 2010, now Pat. No. 8,828,487, and a continuation-in-part of application No. PCT/US2011/050387, filed on Sep. 2, 2011.

(51) Int. Cl.

| | | |
|---|---|---|
| *B05D 1/14* | (2006.01) | |
| *B05D 1/26* | (2006.01) | |
| *B05D 1/36* | (2006.01) | |
| *B05D 1/38* | (2006.01) | |
| *B32B 33/00* | (2006.01) | |
| *B05D 1/00* | (2006.01) | |
| *B32B 5/02* | (2006.01) | |
| *B32B 5/18* | (2006.01) | |
| *B32B 5/24* | (2006.01) | |
| *B32B 37/12* | (2006.01) | |

(52) U.S. Cl.
CPC . *B32B 33/00* (2013.01); *B05D 1/00* (2013.01); *B32B 5/022* (2013.01); *B32B 5/024* (2013.01); *B32B 5/18* (2013.01); *B32B 5/245* (2013.01); *B32B 37/12* (2013.01); *B32B 2305/026* (2013.01); *B32B 2305/18* (2013.01);
(Continued)

(58) Field of Classification Search
USPC ............. 442/76, 86, 381, 394, 268, 277, 286; 428/90; 427/206, 202, 209, 463, 465
See application file for complete search history.

(56) References Cited

U.S. PATENT DOCUMENTS

| | | |
|---|---|---|
| 2,675,330 A | 4/1954 | Schwartz et al. |
| 4,233,027 A | 11/1980 | Albero |

(Continued)

FOREIGN PATENT DOCUMENTS

WO 2010022066 A2 2/2010

OTHER PUBLICATIONS

Corresponding international application Search Report & Written Opinion dated Apr. 18, 2012.

*Primary Examiner* — Cheryl Juska
(74) *Attorney, Agent, or Firm* — Faegre Baker Daniels LLP

(57) ABSTRACT

Protective, multi-layered, breathable fabric constructs having dynamic or static antimicrobial compositions incorporated into adhesive components. The flexible constructs employ a fabric layer and a breathable coating layer applied to the fabric. Under certain preferred embodiments, the fabric constructs also employ an energy dissipating fiber material disposed opposite the coating layer. Also, the present invention teaches a method of protecting a valuable or sensitive object from damage caused by corrosion, weather, biomass, or other environmental related conditions using the fabric material. The fabric constructs may be post-formed using heat or other methods to create shaped-to-form covers.

32 Claims, 5 Drawing Sheets

(52) U.S. Cl.
CPC ..... *B32B 2307/21* (2013.01); *B32B 2307/3065* (2013.01); *B32B 2307/7145* (2013.01); *B32B 2307/724* (2013.01); *B32B 2307/7265* (2013.01); *B32B 2307/752* (2013.01); *B32B 2262/02* (2013.01); *B32B 2262/04* (2013.01); *B32B 2262/062* (2013.01); *B32B 2262/065* (2013.01); *B32B 2262/08* (2013.01); *B32B 2262/106* (2013.01); *B32B 2266/0242* (2013.01); *B32B 2266/0271* (2013.01); *B32B 2266/0278* (2013.01); *B32B 2605/00* (2013.01)
USPC ............. 428/90; 442/76; 442/86; 442/268; 442/277; 442/381; 427/202; 427/206; 427/209

(56) References Cited

U.S. PATENT DOCUMENTS

| | | | |
|---|---|---|---|
| 4,459,332 A | 7/1984 | Giglia | |
| 5,283,112 A * | 2/1994 | Krishnan | 442/263 |
| 5,491,017 A * | 2/1996 | Todt | 428/198 |
| 5,543,195 A | 8/1996 | Squires et al. | |
| 5,712,008 A * | 1/1998 | Todt | 428/34.9 |
| 5,863,633 A | 1/1999 | Squires et al. | |
| 6,045,900 A | 4/2000 | Haffner et al. | |
| 6,562,740 B1 * | 5/2003 | Todt | 442/149 |
| 6,696,120 B1 * | 2/2004 | Todt | 428/34.9 |
| 6,833,334 B1 * | 12/2004 | Elkouh et al. | 442/76 |
| 6,875,712 B2 * | 4/2005 | Todt | 442/149 |
| 7,074,288 B2 * | 7/2006 | Todt | 156/84 |
| 7,393,799 B2 * | 7/2008 | Porter | 442/35 |
| 2004/0176009 A1 | 9/2004 | Hatta et al. | |
| 2005/0176331 A1 | 8/2005 | Martin et al. | |
| 2008/0176468 A1 | 7/2008 | Chen | |
| 2009/0221767 A1 * | 9/2009 | Malet | 525/92 A |
| 2010/0003486 A1 | 1/2010 | Lalgudi et al. | 428/220 |
| 2010/0266774 A1 * | 10/2010 | Yang | 427/358 |
| 2010/0272898 A1 * | 10/2010 | Chen et al. | 427/258 |
| 2010/0272914 A1 * | 10/2010 | Chen et al. | 427/398.1 |
| 2011/0041970 A1 * | 2/2011 | Chang | 150/107 |
| 2011/0092120 A1 * | 4/2011 | Todt et al. | 442/149 |
| 2012/0015161 A1 * | 1/2012 | Todt et al. | 428/198 |
| 2012/0071051 A1 * | 3/2012 | Ray | 442/123 |

* cited by examiner

VAPOR PERMEABLE FABRIC CONSTRUCTS WITH STATIC OR DYNAMIC ANTIMICROBIAL COMPOSITIONS

CROSS-REFERENCE TO RELATED APPLICATIONS

This application is a continuation-in-part of U.S. patent application Ser. No. 12/875,870 filed on Sep. 3, 2010, now U.S. Pat. No. 8,828,487, and of international application PCT/US2011/050387 filed Sep. 2, 2011, the entire disclosures of which are hereby incorporated by reference.

INTRODUCTION

Protecting valuable military and aerospace assets, such as military ground vehicles, weapon systems and other equipment on naval ships and support equipment at airfields from corrosion, mold and mildew is a highly important task for the armed services. Equipment being used in the field has to be ready for use at all times. This need for readiness requires armed forces to spend a tremendous amount of money, time and manpower on the upkeep of equipment.

Common methods to protect these assets vary from shelters with controlled environments to shrink wrap films to heavy-duty-tarps. However all of these methods tend to have a shortcoming for day-to-day use and protection of this valuable equipment. Shelters cannot be built at all locations and they require a lot of capital to build. Shrink wrapping this kind of equipment with shrink film might provide protection for short periods of time, however most shrink film create a barrier where condensation cannot escape over time, thus creating a corrosive environment inside the wrap. Heavy duty covers, such as tarps, can be used on smaller items, however when it comes to larger equipment such as ground equipment or tanks, they add too much weight, eliminating ease of handling—taking away readiness.

One main issue with armored military vehicles such as Bradley or Abram Tanks is that their surface is made up of complex materials such as "Chobham Armour". Chobham Armour often uses a mixture of several ceramic material or metal matrix composites that combine metals, plastics and ceramic. Materials most often used on armor production include boron carbide, silicon carbide, aluminum oxide, aluminum nitride, titanium boride and synthetic diamond composite. By using these materials, armor manufacturers focus on creating the hardest possible surfaces at lightest weight. However, these hard surfaces most often work against a cover that is designed to protect the tank against environmental hazards, such as corrosion. The process of dragging a cover over a tank's armored surface eventually weakens most fabric and shortens the lifecycle of that cover.

Oil and gas exploration and pipeline industries also have problems with environmental corrosion. According to NACE International corrosion is one of the leading causes of storage tank and piping failures. Corrosion related costs for transmission pipelines estimated at $7 billion annually in the U.S. alone and another $5 billion for gas distribution. Protective covers are being used to prevent corrosion on flanges, valves and welded joints. A light weight post-formable fabric with high water vapor transmission rate can help prevent corrosion due to condensation and other environmental elements.

Automobiles and motorcycles also need covers for transport or storage in order to protect against paint damage and corrosion. As these vehicles get transported, it is important to provide sufficient protection against weather elements and possible road hazards such as stones.

Airport ground-support equipment, such as fueling vehicles need protection from environmental hazards as well. However this equipment and what can be used as a cover are highly regulated by aviation rules, due to fire hazard that can be caused by static electricity discharge.

A protective cover system containing a moisture absorbing layer is described in U.S. Pat. No. 7,183,230, US 2005/0059306, US 2007/0228599, and US 2011/0027523.

There is a need for a fabric construct that combines breathability, flexibility, and durability against rough surfaces being covered, yet provide a soft-touch to a sensitive finished surface and that can be converted into protective covers for everyday use.

SUMMARY

The fabric constructs of the present invention include a porous fabric and breathable (i.e. vapor permeable) polymer coating applied to the porous fabric layer, where the end product yields a fabric composite that is water proof, flexible and breathable. The construct has a preferred water vapor transmission rate of at least 100 grams/sq meter/day. Under certain embodiments, the fabric construct will also include a flocked layer applied to the porous fabric layer on the side opposite the breathable polymer coating. The flocked layer employs a combination of materials, size spacing and application parameters to create an energy dissipating fiber network which is resilient yet soft to the touch.

In other embodiments the side of the construct opposite the breathable polymer coating includes, instead of a flocked layer, a non-woven fabric that likewise provides a soft non-abrasive surface suitable for contacting an object to be protected without scratching. Covers formed from the fabric constructs—by either custom sewing or thermoforming to a certain shape by way of non-limiting example—are highly effective in use.

Whichever of a flocked layer and a non-woven layer is present, it is generally used in association with an adhesive package to assist in retaining the flocking or the non-woven on the host porous fabric. The adhesive is hydrophilic and is preferably modified to be hydrophilic by incorporating hydrophilic titanates and/or hydrophilic zirconates as components. The hydrophilic nature of the adhesive helps to concentrate the water molecules closer to the highly permeable polymer layer. Also, the adhesive can be used as a carrier for a vapor corrosion inhibitor chemistry so that the fabric construct can be turned into corrosion preventative covers for military vehicles and equipment, aerospace parts and equipment, automobiles, boats, oil and pipeline equipment and other high value items that needs protection from environmental hazards such as corrosion, mold and mildew. Especially when flocked fibers are present, the adhesive preferably includes a foamed adhesive. In preferred embodiments, the adhesive contains a dynamic or a static antimicrobial composition.

Covers made from the fabric constructs described herein will provide protection from the environment similar to a tarp or shrink wrap film, but also provide a controlled micro-environment by means of high rates of breathability (100 grams/day/sq meter or higher) to retard corrosion especially working in synergy with vapor corrosion inhibitors (VCI's).

DETAILED DESCRIPTION OF THE INVENTION

Figure 1:
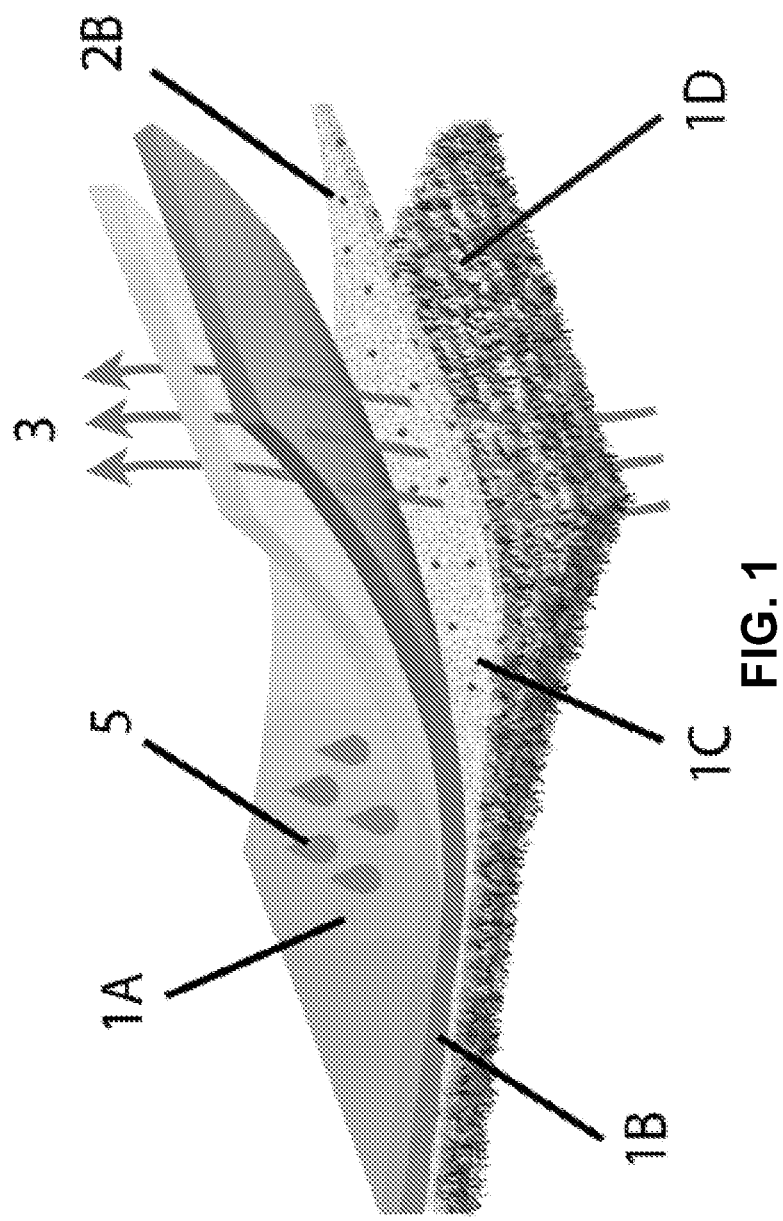
FIG. 1 is a partially separated perspective view showing the different layers that make up the fabric construct of the present invention.

It is to be understood that references to vapor and the like refer to water vapor, i.e. water in the gaseous state. Vapor permeable materials allow the passage of water vapor. Waterproof materials resist the flow of liquid water.

Fabric constructs are useful for being formed into protective covers that protect a covered object from corrosion and other damage due to moisture. The constructs, and the covers made from them, allow water vapor to pass through in a preferred direction, while being waterproof and keeping liquid water out.

The constructs are made by applying various polymeric compositions as adhesive layers or as vapor permeable layers onto a porous fabric, and by applying flocked fibers or a soft non-woven fabric to the porous fabric by means of the adhesives. As used in the description and the claims, the fabrics, fibers, and compositions that go into making the constructs become part of the corresponding layers of the construct, which for ease or reference are referred to as layers of the construct. Thus, when a polymer composition is applied onto a fabric, the composition forms a layer on the fabric. This will apply to adhesive layers and to vapor permeable composition layers. When a porous fabric is incorporated into the construct, it will form a porous fabric layer. When flocked fibers are applied by means of (preferably foamed) adhesive, they form a flocked fiber layer of the construct, and so on. Manufacture of the constructs is described by the steps of applying various compositions to fabrics, or by applying fibers to an adhesive and the like. These applying steps result in incorporation of all the components of the thing applied into the final construct, with the exception of volatiles and the like that are removed during further processing. An example of the latter is the removal of water from the vapor permeable polymer composition.

Especially when dealing with applying the vapor permeable polymer composition and the adhesive composition, it is to be understood that such applying can be carried in multiple coatings. Examples are the application of a primer before applying the vapor permeable composition, and the application of multiple coats of an adhesive composition, such as when a so-called "bottom coat" or "pre-coat" is applied, or when a "topcoat" of adhesive is applied over the bottom coat or pre-coat. Sometimes, the topcoat and pre-coat are made of the identical composition, so that the multiple coating results in a thicker deposition of material than would occur in a single pass. Multiple coatings are used to build up a layer or to provide a robust surface for the second coat. Depending on the application, a layer can be dried or cured between coats, or the coats can be applied and dried or cured together.

The present invention relates to a fabric construct including a porous fabric layer, and a vapor permeable polymer composition applied to the porous fabric layer, with at least one of a flocked fiber layer and a non-woven fiber attached by means of an adhesive composition to the side of the porous fabric layer opposite the vapor permeable polymer. Put another way (and equivalently in the structure that it describes), the construct includes 1) a porous fabric layer; 2) an adhesive layer applied to the fabric layer; 3) Flock fibers applied on the adhesive and cured by heat; and 4) a water proof, moisture vapor permeable polymeric composition applied to the porous fabric on the side opposite the fiber layer and cured by heat. The fiber layer is made of one of a non-woven fabric and a layer of flocked fibers, as explained in more detail below. In one aspect, a flocked fiber layer (also referred to as a layer of flocked fibers) and a vapor permeable polymer composition are employed on opposite sides of the porous fabric layer. In another aspect, a non-woven fabric and a vapor permeable polymer composition are employed on opposite sides of the porous fabric.

In various embodiments, features of the individual layers are mixed and matched to provide a wide range of constructs, all of which share the feature of protecting an object from the environment while advantageously removing water vapor. Options for selecting suitable materials as the porous fabric, the vapor permeable polymer composition, the adhesive composition, the primers, and the flocked fibers are provided in the description.

As noted, in one embodiment, a fabric construct according to the invention is made of a porous fabric layer, an adhesive layer applied to the fabric layer, and a layer of flocked fibers applied to the adhesive layer. Further, there is a substantially waterproof, vapor permeable polymer composition applied to the porous fabric on the side opposite the flocked fibers. In various embodiments, the porous fabric is a non-woven, a woven, or a combination of a woven and non-woven fabric. In various embodiments, the adhesive layer is selected from acrylic latexes, urethanes, and epoxies, or is selected from thermoplastic hot melt rubbers, especially non-pressure sensitive compositions that lack tackifiers. In preferred embodiments, the adhesive is hydrophilic and can contain hydrophilic making additives selected from titanates and zirconates, especially hydrophilic titanates and zirconates. The adhesive layer can further contain, as needed, one or more additives selected from vapor corrosion inhibitors, antistatic agents, antimicrobials, biostatics, and fire resistant additives. The adhesive preferably contains a dynamic or a static antimicrobial composition. In preferred embodiments, the adhesive layer is foamed.

In another embodiment, a non-woven fabric is applied opposite the vapor permeable polymer composition, using the adhesive compositions described herein.

The flocked fibers (i.e., the fibers that are adhered to the porous fabric to make up the flocked fiber layer of the construct) are selected from natural and synthetic fibers. In various embodiments, the flocked fibers are characterized by an average denier of between 0.5 and 90.0 and/or an average length between 10 mils (0.254 mm) and 380 mils (9.65 mm). The flocked fibers are capable of wicking moisture in the direction of the porous fabric layer to which they are attached by means of the adhesive composition.

In various embodiments, the substantially waterproof, moisture vapor permeable coating is made of a polyamide/polyether block co-polymer, or is made of a material that comprises a fatty acid modified ionomer at least partially neutralized with potassium or sodium, or is made of an aliphatic polyurethane coating. In a preferred embodiment, the vapor permeable polymeric composition comprises a potassium salt of a fatty acid and an ionomer comprising a plurality of carboxylate groups, at least some of which are modified by a potassium ion.

In another preferred embodiment, an aliphatic urethane coating is used as the vapor permeable polymer composition. Suitable urethane coatings adhere without co-extrusion, and can be conveniently applied using extrusion coating techniques. While some coatings tend to weaken physical properties such as tear strength of the underlying fabric, the urethane coatings have been surprisingly found to actually increase the tear strength of the coated fabric and the fabric constructs containing them. Advantageously, the urethane coatings have good toughness reflected in good Taber abrasion numbers. In a preferred embodiment, the urethane coatings contain an anti-tack additive that lowers the abrasion property even further. This leads to a favorable anti-snagging property of the fabric construct as well as the other benefits.

A polyurethane coating is advantageously applied to a primer layer after a first layer containing the primer material is applied to the porous fabric. To build the fabric construct, this primer is applied to one side of what will later become the porous fabric layer of the construct either before or after the flocked fibers or, as the case may be, the non-woven fabric is applied to the other side. In one embodiment, the primer for the polyurethane coating is a water based acrylic latex primer.

The vapor permeable polymeric composition preferably forms a top layer (or topcoat) of the construct and has an average thickness of 0.5 mils (0.0127 mm) to about 10 mils (0.254 mm), in a preferred embodiment. The vapor permeable polymeric composition forms a "top" layer having a high water vapor transmission rate, but it is generally impervious to transmission of liquid water (i.e., it is said to be "waterproof"). In a preferred embodiment, the water vapor transmission rate of the vapor permeable polymeric composition is at least 100 grams/square meter/day at 37.8 degrees Celsius and 100% relative humidity. (The coating containing the permeable polymeric composition is normally rate limiting as to vapor permeability of the construct of which it is a part, such that the same levels of water vapor transmission obtain for the construct as a whole.)

The porous fabric layer is made of a woven or non-woven material. In some embodiments of the construct, the porous fabric layer is made of a two-stage non-woven fabric having a first side or stage characterized by fibers of a first hydrophilicity and a second side or stage characterized by fibers of a second hydrophilicity different from that of the fibers of the first side. The two-stage fabric is optionally stitch reinforced.

In another embodiment, a method of manufacturing a cover material that is substantially waterproof and permeable to moisture vapor involves the steps of providing a porous fabric layer and applying an adhesive to the fabric layer. Thereafter, flocked fibers or a non-woven fabric are applied to the adhesive layer, and then a substantially waterproof, moisture vapor permeable polymeric top layer is applied to the porous fabric on the side opposite the adhesive and the flocked fibers or non-woven fabric. The order of the steps can be changed as discussed further herein.

The adhesive is applied to the porous fabric by spray coating, knife coating, curtain coating, reverse roll coating, gravure coating, rotary screen coating, and the like. The adhesive in various embodiments includes vapor corrosion inhibitors (VCI), anti-static agents, antibacterial and biostatic additives, antimicrobial compositions, and/or fire resistant additives, depending on the conditions of use.

Flocked fibers are applied electrostatically and mechanically to the adhesive. The flocked fibers are chosen from materials that are capable of surviving the conditions of any further manufacturing steps taken after they are flocked. In non-limiting examples, the flocked fibers are selected from rayon, acetate, nylon, polyolefin, acrylic, polyester, carbon fiber, cotton, hemp, and wool fibers.

In another embodiment, a fabric construct is provided that comprises a stitch reinforced two-stage non-woven entangled fabric having a water vapor permeable polymeric composition applied on a major surface of the non-woven fabric. The two-stage non-woven entangled fabric has a first major surface characterized by having fibers of a first hydrophilicity and a second major surface characterized by having fibers characterized by a second hydrophilicity. The hydrophilicity of the fibers on the second major surface is greater than the hydrophilicity of fibers on the first major surface. Finally, the vapor permeable polymeric composition is in contact with the second major surface of the fabric, i.e., the surface characterized by fibers of greater hydrophilicity.

In various embodiments, the non-woven fabric used in the fiber construct is prepared by carding a layer of fibers having a first hydrophilicity, placing a stitch knit fabric on the carded layer, and applying onto the stitch knit fabric a second card of fibers having a second hydrophilicity. The hydrophilicities of the first and second card are different. After applying the two cards with the interposed stitch knit fabric, the fibers of the non-woven fabric are entangled, such as by hydroentangling or needle punching.

In this embodiment, the non-woven fabric is covered on one side by a water vapor permeable polymeric composition as described herein. In preferred embodiments, this permeable polymeric composition includes a fatty acid modified ionomer composition partially neutralized by sodium or potassium. Alternatively, the vapor permeable polymeric composition includes a polyamide/polyether block co-polymer or other polymeric composition providing suitable vapor permeability. In another embodiment, the vapor permeable polymer composition includes an aliphatic polyurethane coating.

In another embodiment, covers are formed from the vapor permeable, coated, and optionally flocked constructs. Depending on the nature of the object to be protected by the cover, the construct and the cover can be provided with different vapor permeabilities at different locations. In this embodiment, where the vapor permeability in a particular area of the cover is less than other areas or is essentially zero, water vapor will tend to migrate to areas of the cover with greater permeability where it can escape.

Structure of the Constructs

Referring to FIG. 1, the top layer of a fabric construct 1 is a water proof highly breathable (i.e. water vapor permeable or moisture vapor permeable) polymer composition (1A). Under 1A, there is a porous fabric with high tear and physical properties, yet low weight (1B). There is an optional primer layer (not shown) between 1A and 1B. 1B can be a woven, a nonwoven or a combination thereof. Porous fabric (1B) is coated by, or in contact with, an adhesive layer (1C), where the adhesive may contain titanates and vapor corrosion inhibitors (2B) and other additives to enhance the properties of the fabric construct. Adhesive (1C) also locks the flock fibers (1D) in place, perpendicular to the fabric surface (1B). The fabric construct (1) is water proof keeping liquid water (5) outside, while allowing water vapor (3) to be pushed out in order to provide a modified environment to prevent corrosion.

While not shown in FIG. 1, the porous fabric can be coated with another layer of adhesive on the opposite side of the flocked fiber and then laminated to a highly permeable polymer film made from a vapor permeable polymer composition such as the kind used for co-extrusion or extrusion coating. Further details of laminating the highly permeable polymer film are found in international publication WO 2010/022066, the disclosure of which is incorporated by reference.

In a more specific and preferred embodiment, the fabric construct of the present invention is manufactured by first providing a porous fabric and coating one side of the porous fabric with a pre-coat adhesive. Then a second coat of adhesive is applied on top of the pre-coat adhesive and flock-grade fibers are applied in a flocking operation. The fibers are applied by electrostatic and mechanical forces where they are exposed to certain amount of charge that keeps the fibers substantially perpendicular to the adhesive coated surface. Following the addition of fibers to adhesive layer, the adhesive is cured in order to lock the standing fibers in place. Thereafter, the flocked porous fabric preform is extrusion coated on the side opposite the flocked fibers with a breathable polymer composition that is designed to service outdoor environments.

Figure 2A:
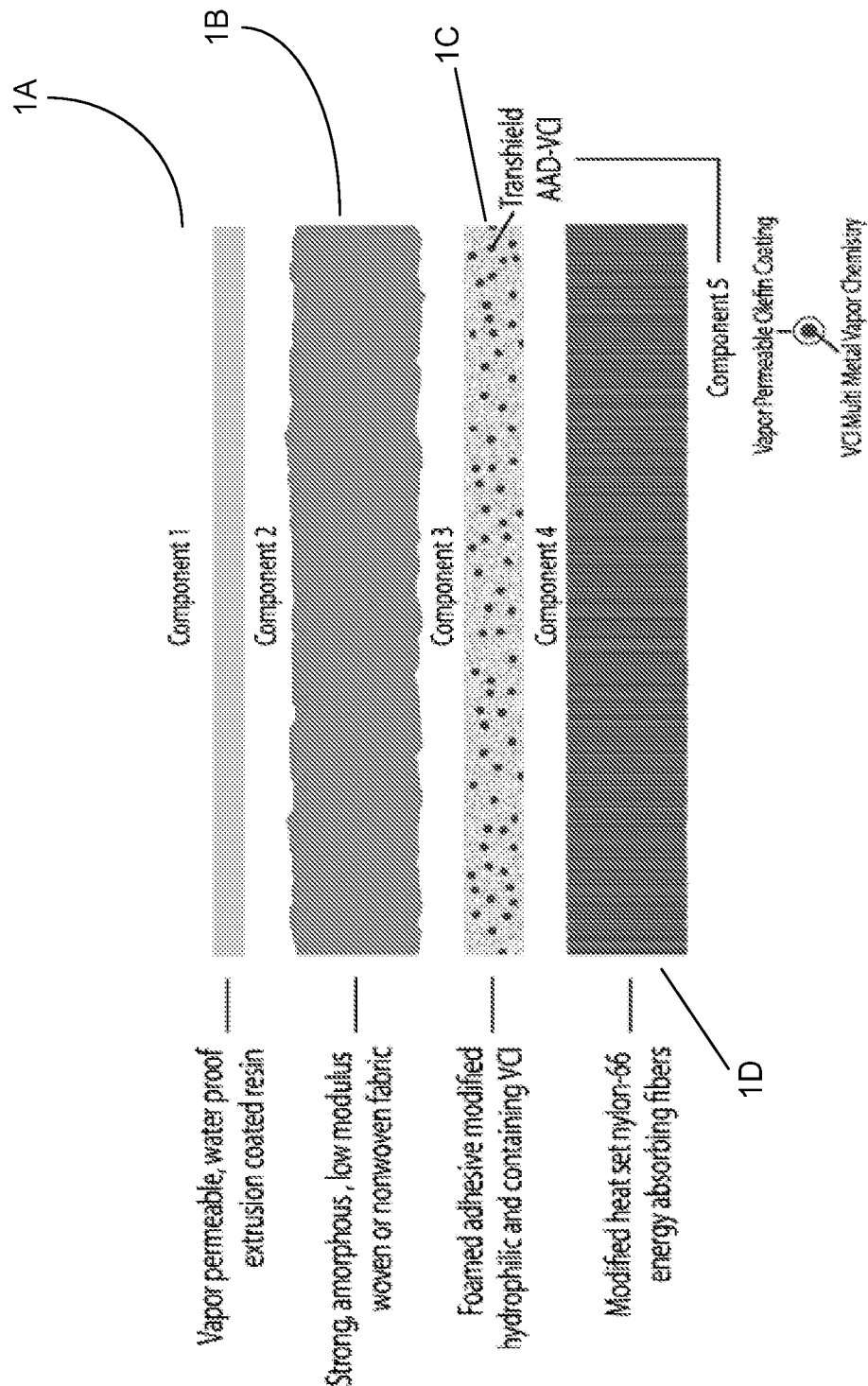
FIG. 2 is a cross sectional view of a construct of the invention, FIG. 2a showing separated components and FIG. 2b showing the integration of different layers with each other.

FIG. 2a shows an expanded cross-section of a fabric construct of the invention showing the individual layers. Thus, FIG. 2a illustrates the vapor permeable polymeric composition 1A, the porous fabric 1B, the adhesive layer 1C, and a flocked fiber layer 1D. In an alternative embodiment, layer 1D is a non-woven fabric as further described. Although the invention is not to be thereby limited, FIG. 2a also shows, in illustrative fashion, one example of the relative thicknesses of each of the layers.

Figure 2B:
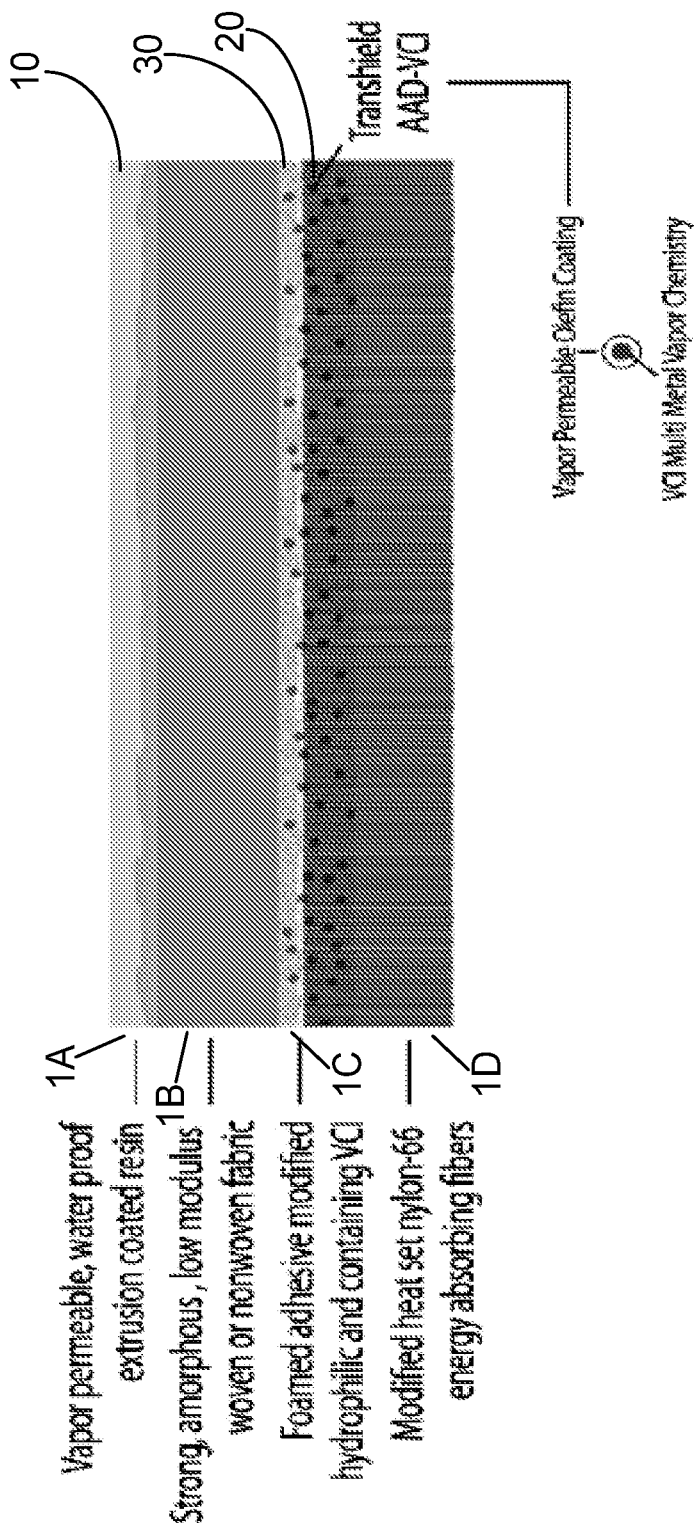

FIG. 2b shows a cross-section of a construct of the invention wherein the layers 1A, 1B, 1C, and 1D are combined into the construct. Thus, the vapor permeable polymeric composition 1A, the porous fabric 1B, the adhesive 1C, and the flocked fibers (or non-woven fabric) 1D are shown in cross-section in FIG. 2b. FIG. 2b also illustrates that the thickness of the construct is less than the additive thicknesses of the individual layers. This is seen in FIG. 2b, for example, in the illustrated "overlap" of the polymeric composition 1A and the porous fabric 1B, shown as element 10. Further, the adhesive 1C and a flocked fiber layer 1D are shown to "overlap" at region 20 of FIG. 2b. Finally, the adhesive and the porous fabric are shown to "overlap" at region 30 of FIG. 2b. The structure of the construct shown in FIG. 2b is the result of the manufacturing steps that are carried out as described herein. In a preferred embodiment, a porous fabric 1B is coated with an adhesive 1C and flocked fibers 1D are added. The flocked porous fiber then undergoes a coating step, such as by extrusion coating to apply the vapor permeable polymeric composition 1A.

Methods of Making the Constructs

The constructs are put together in a series of adhesive coating, extrusion coating, flocking, and other operations using conventional equipment well known in the industry. Suitable weights for the fabrics and suitable loadings for the applied coatings are chosen depending on the application and the result required. Depending on the final structure of the construct, more than one method may be available to make it. Non-limiting examples of methods A through E are here briefly described. Further details are given in the rest of the description herein and in the Examples.

Method A

This method is used to make a fabric construct with a polyurethane vapor permeable coating and flocked fibers opposite the vapor permeable coating. It involves applying a coating of aliphatic polyurethane on one side of a porous fabric;

applying a foamed adhesive composition to the side of the porous fabric opposite the polyurethane coating; and applying flocked fibers to the foamed adhesive composition.

In some embodiments, applying the foamed adhesive composition involves applying a pre-coat and a topcoat, where the pre-coat and the topcoat contain vapor phase corrosion inhibitors (VCI) and a coupling agent selected from titanates and zirconates.

Method B

This method is used to make a fabric construct where a vapor permeable coating containing block copolymer or ionomer is applied opposite a flocked fiber layer. the method involves:

applying a foamed adhesive composition onto one side of a porous fabric;

applying flocked fibers to the adhesive composition; and extrusion coating the vapor permeable polymer composition onto the porous fabric on the side opposite the flocked fibers.

The vapor permeable polymer composition comprises a polyamide/polyether block copolymer, a fatty acid modified ionomer at least partially neutralized with potassium ions and/or sodium ions, or a potassium salt of a fatty acid and an ionomer comprising a plurality of carboxylate groups.

In some embodiments, applying the foamed adhesive composition involves applying a pre-coat and a topcoat, where the pre-coat and the topcoat comprise vapor phase corrosion inhibitors (VCI) and a coupling agent selected from titanates and zirconates.

Method C

This method involves:

applying a hot melt adhesive composition to one side of a porous fabric, wherein the hot melt adhesive composition comprises a non-pressure sensitive thermoplastic hot melt rubber and vapor phase corrosion inhibitor (VCI);

applying a foamed adhesive composition onto the adhesive composition comprising the thermoplastic hot melt rubber;

applying flocked fibers onto the foamed adhesive composition; and applying the vapor permeable polymer composition onto the porous fabric on the side opposite the adhesive and the flocked fibers, and wherein the hot melt adhesive composition is a hot melt block rubber.

In an embodiment, the foamed adhesive composition is selected from acrylic latexes, urethanes, and epoxies.

Method D

This method, like Method A, is used for making a construct with flocked fibers and a polyurethane permeable coating. It involves applying a vapor permeable polyurethane composition onto one side of a porous fabric;

applying a non-pressure sensitive hot melt block rubber composition comprising VCI onto the side of the porous fabric opposite the polyurethane coating;

applying a foamed adhesive composition onto the adhesive composition comprising the thermoplastic hot melt rubber; and applying flocked fibers onto the foamed adhesive composition.

Method E

This method can be used to make a construct having a non-woven fabric as the protective soft fiber layer. It involves:

applying a coating of aliphatic polyurethane on one side of the porous fabric;

applying a hot melt adhesive composition to the side of the porous fabric opposite the polyurethane, wherein the hot melt adhesive composition comprises a pressure sensitive thermoplastic hot melt rubber and vapor phase corrosion inhibitor (VCI);

adhering the non-woven fabric to the hot melt adhesive composition.

Method F

Another method of making a construct having a non-woven fabric involves a lamination process, namely:

applying a coating of aliphatic polyurethane on one side of a porous fabric to make a first lamination part;

applying a layer of adhesive to one side of a non-woven fabric to make a second lamination part; and forming the construct by laminating the porous fabric side of the first to the adhesive side of the second part.

Operation of the Constructs

In one aspect, the fabric construct of the present invention is useful for advanced packaging operations. A packaging defines a volume for containing a product. The invention provides a method of packaging an object where the flocked side of the construct is facing the object to be protected, allowing the flocked fibers to create a soft surface where they will not damage the surface of the object being protected. Yet, this soft surface is resistant to abrasion, so that it can be placed over objects that have very rough surfaces, such as armored vehicles.

As will be described in greater detail below, the material of the non-woven fabric 1D and/or size of the flocked-fibers 1D pull moisture, such as condensation, away from the surface of the object covered by the fabric construct or packaging formed therefrom. As the water is pulled by capillary action away from the surface into the interior of the construct, the cured adhesive composition will provide sufficient polarity and/or hydrophilicity by use of hydrophilic titanates or zirconates, by way of non-limiting example, to attract water molecules. As the water molecules are attracted towards the hydrophilic adhesive layer, a micro environment is created within the layers of the construct where water molecules are concentrated within the foamed adhesive where the relative humidity is at high levels. As the water moves further away from the surface of the construct facing the protected object and through the porous fabric in the middle of the construct, the vapor permeable polymer layer on the opposing side will allow the water vapor to pass though. In this way, the water inside the packaging will be attracted towards the outside which has a lower percent relative humidity than the interior micro environment of the packaging. Furthermore the porous fabric, either woven or nonwoven or a combination thereof, will allow the breathable (i.e. vapor permeable) polymer coating to penetrate well into the fabric during the calendaring process which results in an application sufficient to pull water away from the object being protected. As shall be understood by those skilled in the art, permeation rates are affected by temperature, humidity and pressure. According to a common rule of thumb, permeability increases by 30% to 50% for every 5 degrees Celsius rise in temperature (Massey, 2003).

The permeability or transmission rate of gasses and vapors through the polymeric material is dependent upon two factors; the solubility of a gas or vapor and the rate of diffusion though the polymer matrix. The solubility function is dependent upon the chemical relationship between the permeant molecule and the polymer; and the rate of diffusion is dependent up on the size of the permeant molecule and the amorphous configuration of the barrier polymer.

In another aspect, the adhesive used in the fabric construct carries vapor corrosion inhibitors, allowing the fabric composition to be used as a corrosion preventative cover. Use of vapor corrosion inhibitors is generally discussed in U.S. Pat. No. 5,736,231 (Todt G. L., 1998); U.S. Pat. No. 5,705,566 (Todt G. L., Adhesive With Additive Delivery System, 1998); WO 2010/022066 A2 (Todt & Ozol, Water Vapor Permeable Shrinkable Fabric, 2010); PCT/US09/044,686 (Todt & Ozol, Adhesive Composition and Method, 2010), all of which are hereby incorporated by reference. Suitable vapor corrosion inhibitors are disclosed in the referenced patents and further below.

Figure 3:
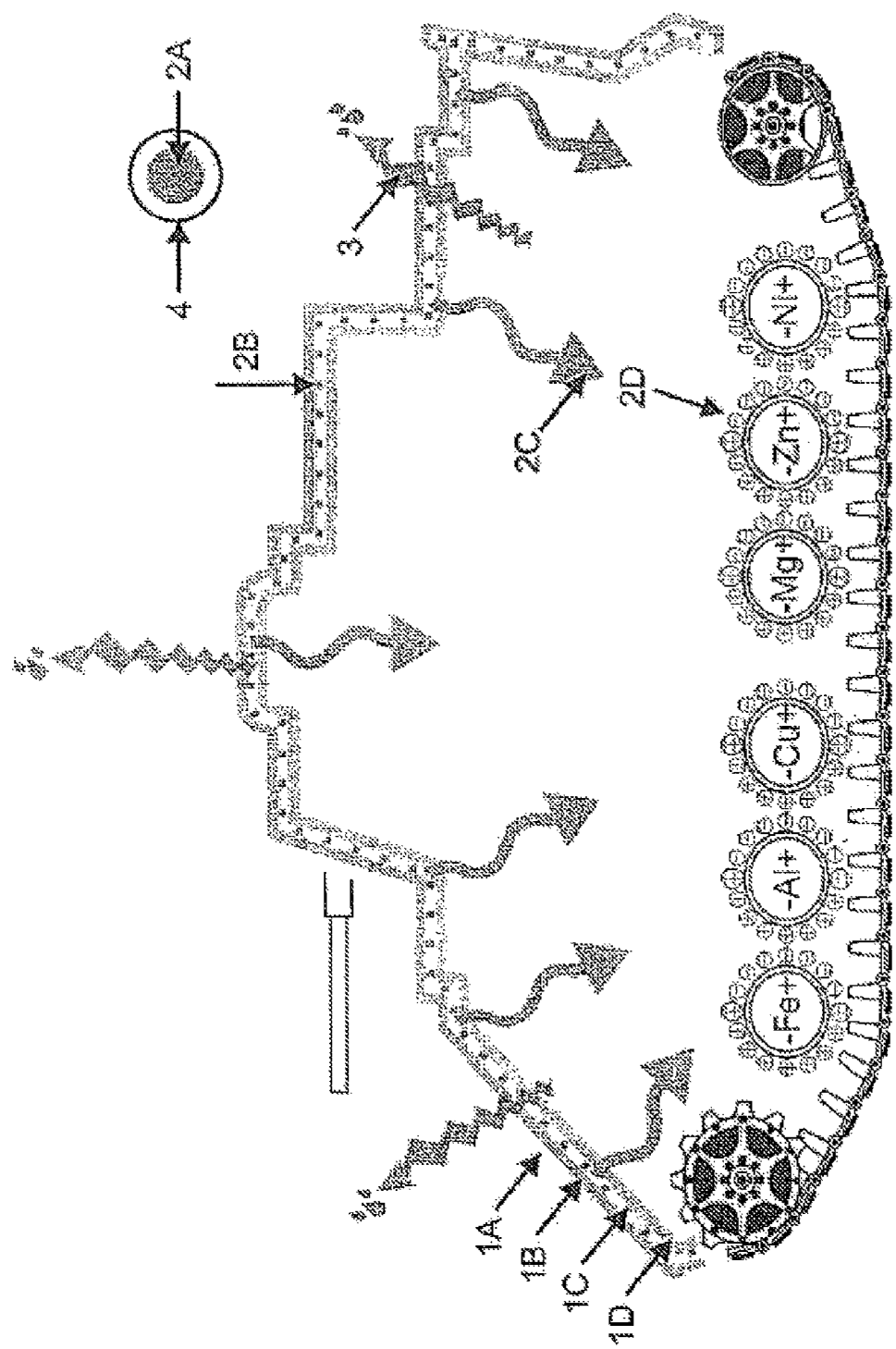
FIG. 3 is a demonstrative view showing the fabric construct applied to an object that is prone to corrosion.

Referring to FIG. 3, a general discussion as to the fabric construct of FIG. 1 in a packaging form, e.g., cover, is also provided. Water vapor (3) is removed from the inside of a cover with the assistance of vapor corrosion inhibitors (2A, 2B,2C,2D). As will now be described, the vapor corrosion inhibitors work essentially in phases throughout the moisture removal process. (2A) represents the corrosion inhibitor in its initial format. The corrosion inhibitors can be encapsulated (4) before application in order to prevent loss of VCI vapor (2C). (2B) represents the corrosion inhibitors inside an adhesive layer. (2C) represents the volatile corrosion inhibitor after it is volatilized from the adhesive into the package/cover; (2D) represents the corrosion inhibitor as it is condensed onto a metal surface to prevent corrosion on the object contained therein.

In a preferred embodiment, the fabric constructs of the present invention show a pattern, such as military digital camouflage. One way of doing this is to mark a pattern on the porous fabric before the flocking operation is carried out on the side of the fabric opposite the marking. One method of marking is to carry out a fabric printing step. Alternatively, a patterned fabric can be provided with conventional weaving techniques. Either way, the patterned fabric is subjected to a flocking operation to place flocked fibers on a side of the fabric opposite the desired print pattern. Then an extrusion coating or other process can be used to apply a breathable film coating on the print side opposite the flocking. In an embodiment, the breathable film coating is a clear coating that allows the marking, pattern, or print to show on the fabric construct opposite of the flocked side. Another way of providing constructs showing a pattern is to coat the fabric with a breathable polymer before any marking, printing, or flocking step. Then, the fabric side containing the permeable polymer composition is treated and printed, or the polymer coating can have color added in the form of a master batch.

With the above teachings in mind, additional information regarding the various materials and compositions employed in forming the fabric constructs of the present invention, and ultimately packaging formed therefrom will now be described.

Vapor Permeable Polymeric Coating

The fabric constructs of FIGS. 1-3 utilize a polymeric coating on one side of a porous fabric. The polymeric coating provides good adhesion to the porous fabric and is breathable. By "breathable", it is meant that the polymeric coating is impermeable to liquids (and especially in many applications to liquid water) but is permeable to water vapor. If the breathable coating is impermeable to liquid water, it is called a "waterproof" coating. The layer of the construct formed from the vapor permeable polymer composition thus acts as a water barrier but allows vapor, such as water vapor, to pass through. Under preferred embodiments, the fabric constructs have a water vapor transmission rate (WVTR) of at least 100 grams/sq meter/day at 37.8° C. (100.04 F) or at least 120 grams/sq meter/day at 37.8° C.

For the constructs having flocked fibers, the porous fabric can be coated with the polymeric coating before or after the flocking and printing operations. However the most desired application is to coat the porous fabric that has flocked fibers on the opposing side and that is printed on the same side as the coating. It has been surprisingly found that extrusion coating can be used to coat a vapor permeable polymeric composition onto a flocked fabric.

Suitable polymers for the vapor permeable film are commercially available. Polymers that allow high water vapor transmission rates as listed on Permeability Properties of Plastics and Elastomers by L. K. Massey include polyether amide and polyether ester with 300 to 1,000 and 200 to 900 grams of water per millimeter/square meter per day are provided as examples.

Commercial polyether amide resins are available through Arkema under the trade name PEBAX®. PEBAX® is a polyether block amide, also called a polyamide/polyether block copolymer with high physical properties, allowing the coating to be waterproof, yet provide high water vapor permeability. Examples of suitable resins from Arkema include MX 1205 SA 01; MV 1041 SA 01; MV 3000 SA 01; and MV 1074. These resins can be combined with UV stabilizers to provide a coated breathable surface for the fabric composite.

The urethane coating compositions normally contain other additives in addition to the water dispersible polyurethanes. Examples are given in the Table.

Another class of suitable polymers for forming the vapor permeable film is the fatty acid modified ionomers (FAMI) of Dupont™. These are polymers containing a plurality of carboxyl groups in their backbone, formulated with fatty acid salts. In various embodiments, the carboxyl groups of the polymer and fatty acid are partially neutralized with sodium (following DuPont jargon, these are known informally as "FAMI-Na" in the industry) or with potassium (likewise known as "FAMI-K").

The fatty acid modified ionomers contain one or more E/X/Y copolymers and one or more organic acids or salts thereof with a fraction of carboxylate groups being modified or neutralized with an alkali metal. The ionomers are typically combined with other polymers to provide suitable vapor permeable polymeric compositions. A description of suitable ionomers and of vapor permeable polymeric compositions containing the ionomers can be found in U.S. Publications 2007/0287019 A1 and 2007/0283652 A1 which are hereby incorporated by reference.

Suitable resins for use in the polymer composition of the present invention include DuPont™ Entira™ Breathe. These resins can provide water vapor transmission rates at one mil of up to 12,000 grams per square meter.

As noted in the foregoing application(s) the disclosed breathable polymers were intended for lamination to various fabrics. However, it has now been determined that these compositions are suitable for extrusion coating onto flocked fabrics in processes of the present invention. Unlike a lamination process, an extrusion coating process allows the coating to be embedded into the fabric, allowing the thickness of the fabric constructs to be reduced. Blends of water vapor permeable resins which are suitable for extrusion coating are also described in U.S. patent application Ser. No. 12/762,818 (Chen, 2010), now U.S. Publication 2010/0272914, published Oct. 28, 2010 and Ser. No. 12/762,919 (Chen, Method For Preparing A Selectively Permeable Protective Structure, 2010) now U.S. Publication 2010/0272898, published Oct. 28, 2010, the disclosures of which are hereby incorporated by reference. The extrusion coated layer can either be a monolayer application or a co-extruded application with two or more layers.

A non-limiting example of a polymer blend that can be used as a coating is a blend of DuPont™ Elvaloy®AC 1224-50% by weight of polymers; DuPont™ Entira™ Breathe—40% by weight of polymers; DuPont™ Fusabond® FB556-10% by weight of polymers primary. The composition blend will support the inclusion a weathering package, such as one containing one or more additives selected from primary and secondary antioxidants, UV stabilizers and hindered amine light stabilizers by way of non-limiting example. Suitable additives for the weathering package include Tinuvin 328, Tinuvin 770, Chimassorb 944 and Irganox 100 from BASF (Formerly Ciba Specialty Chemicals). Preferred loading of the weathering package is preferred to be 1% or less of the total polymer by weight. Possible loading combinations can be seen in the table. These packages will protect the polymer structure in processing and outdoor weathering during its use.

TABLE 1

Exemplary stabilizer recipes for the polymeric coating

| | | | | Preferred Range | |
|---|---|---|---|---|---|
| | Property | % in Film | ppm | % in Film | ppm |
| Package #1 | | | | | |
| Tinuvin 770 | HALS - Low Molecular Weight | 0.20% | 2000 | 0.30% | 3000 |
| Chimassorb 944 | HALS - High Molecular Weight | 0.10% | 1000 | 0.20% | 2000 |
| Tinuvin 328 | High Performance UVA | 0.20% | 2000 | 0.40% | 4000 |
| Irganox 1010 | Thermal Stability | 0.10% | 1000 | 0.10% | 1000 |
| TOTAL | | 0.60% | 6000 | 1.00% | 10000 |
| Package 2 | | | | | |
| Tinuvin 770 | HALS - Low Molecular Weight | 0.00% | 0 | 0.00% | 0 |
| Chimassorb 944 | HALS - High Molecular Weight | 0.25% | 2500 | 0.40% | 4000 |
| Tinuvin 328 | High Performance UVA | 0.25% | 2500 | 0.40% | 4000 |
| Irganox 1010 | Thermal Stability | 0.10% | 1000 | 0.20% | 2000 |
| | | 0.60% | 6000 | 1.00% | 10000 |

If desired, the vapor permeable polymeric layer of the fabric composition can be further enhanced by use of other additives including antimicrobials, colorants, coupling agents, flame retardants, mold release agents and antistats, among others.

Because the unique properties of the above described resin blends, additive packages can be limited to no more than 1%. In order to improve the anti-static properties of the fabric constructs described herein, the coating blends can be further modified as described by European Patent EP1 569 794 B1 (Chen, 2005). Rendering the fabric constructs anti-static in nature will allow for its use in certain highly regulated industries such as the aviation industry, where static electricity regulations are heavily applied in regards to airplane fueling/de-fueling. In aviation industry plastic containers are not to be used for into-aircraft refueling or defueling as the static electricity charge potential is sufficient to cause a spark with potential explosive results.

Urethane ("polyurethane" is used interchangeably) coatings can also be used. Urethane coatings are preferably selected from aliphatic polyether urethanes that are water soluble or water dispersible. The aliphatic urethanes are based on polymers of saturated isocyanate monomers such as hexamethylene diisocyanate (HDI) and isophorone diisocyanate (IPDI) with polyethers such as polyethylene oxide. In addition to the hydrophilic polyethers, water dispersible groups such as carboxylate and sulfonate can be incorporated into the urethane polymer system to render them water dispersible, using known methods. The coatings preferably exhibit a high hydrostatic head measured according to standard industry tests such as ISO 811. Suitable urethane dispersions are commercially available, for example from Bayer under the Impranil®, Baybond®, and Dispercoll® trade names, and also from Michelman (Hydrosize®), Lubizol (Sancure®), and Chemtura (Witcobond®). The urethane coatings are waterproof and highly breathable, providing the vapor permeable polymer composition for the "outside" surface of the fabric constructs. Additionally, suitable polyurethane vapor permeable coatings are described in US 2010/0266774 A1 published Oct. 21, 2010, the disclosure of which is incorporated by reference.

The urethane coating composition applied to the porous fabric or to a primer layer on the porous fabric generally contains a urethane dispersion, a crosslinking resin, and a rheology modifier. Optional further ingredients include antitack agents, plasticizers, crosslinking catalysts, defoamer, pH adjusters, mineral extenders (e.g. calcium carbonates) as flattening agents, tack modulators, or cost reducers, dispersants, antimicrobial agents, pigments, opacifiers, dyes, colorants, antioxidants, anti-aging agents, UV resistance agents, anti-weathering agents, and the like. Further illustrative examples are provided in Table 2 giving a typical formulation.

TABLE 2 formulations for the polyurethane vapor permeable polymer composition

| Low | High | Exemplary | Component, function, and/or supplier and trade names |
|---|---|---|---|
| 25 | 75 | 35 | Water |
| 1 | 50 | 3 | Polyurethane dispersions/emulsion, preferably aliphatic, selected for weatherability and to modulate MVTR (Bayer: Impranil, Baybond, Dispercoll, Michelman: Hydrosize, Lubrizol: Permax, Sancure, Chemtura: Witcobond) |
| 0 | 50 | 10 | Non-polyurethane dispersion/emulsion, preferably acrylic, 0 selected for weatherability and cold flexibility (Lubrizol: Acrylic, Omnova: Omnapel, Acrygen, BASF: Acronal, Dow: Rhoplex, UCAR) |
| 0 | 20 | 5 | Paraffin/polyethylene wax emulsion selected for water repellancy and surface tack reduction (Lubrizol: Aquaslip, Michelman: Michem lube, BykChemie: Aquacer, Aquamat) |
| 0 | 20 | | Plasticizer selected for weatherability and cold flexibility (phthalates, benzoate esters, citrates, phosphate esters, adipates) |
| 0.1 | 10 | 1 | Crosslinkable resin and modified melamines (Cytec: Cymel, Aerotex, Ineos: Resimene, Lubrizol: Carbocures) |
| 0 | 5 | | Crosslinking catalysts selected to depress activation temperature of crosslinking resin (pTSA, ammonium chloride, etc) |
| 0 | 1 | 0.2 | Defoamer additive selected to control air entrainment during manufacture (BykChemie: Byk, Emerald: Foam Blast) |
| 0.1 | 10 | 1 | Rheology modifier (cellulosiic, associative, polyacrylates, xanthum gums, bentonites) |
| 0 | 5 | 0.8 | pH Adjustment (ammonia, caustic) |
| 0 | 50 | 10 | Mineral extender selected as flattening agent, tack modulator and cost reduction (Minex: Nepheline Syenite, Specialty Minerals: Marblewhite calcium carbonates) |
| 0 | 5 | 1 | Dispersant/surfactant selected to deagglomerate slurries, stabilize suspensions and viscosity (R T Vanderbilt: Dana, Byk Chemie: AntiTerra, Byk, BASF: Dispex, Dow: Triton, Rhodia: Igepal) |
| 0 | 5 | 2 | Antimicrobial agent selected for dry state microbial and fungus resistance (Troy: Polyphase, Arch: Proxel, Densil, Omadine, Dow: Skane) |
| 0 | 10 | 3 | Pigmentation, Colorant, Opacifier, Dye (BASF: Aurasperse, Sun Chemical: Sun, Ferro: Plasticolors: Colormatch, Keystone: Keysperse) |
| 0 | 5 | 1 | Antioxidant optional selected for aging, weathering, and UV resistance (BASF: Irganox, Tinuvin) |

The urethane coatings are applied by direct coating or by transfer coating, using conventional coating equipment. A water based acrylic latex basecoat or primer is preferably used to enhance coverage and adhesion of the urethane permeable coating. In a typical embodiment, the urethane is applied at about 0.1 to 10 ounces dry weight per square yard, for example about 4 ounces per square yard. Wet thickness of the application is about 3 to about 60 mils or about 8-20 mils. In particular embodiments, the thickness is 16-18 mils or about 17 mils.

Extrusion Coating

While aqueous polyurethane dispersions are applied by direct or transfer coatings or with suitable methods such as the knife over roll coating method, vapor permeable coatings with solid components can be applied by extrusion coating the permeable polymer compositions onto a porous fabric that contains flocked fibers or, in another embodiment, that contains a non-woven fabric on the side of the porous fabric opposite the vapor permeable coating. Advantageously, the constructs are characterized by an adhesion peel strength in the preferable range of 500 g/in (197 g/cm) and higher. In various embodiments, the peel strength is 600 g/in (236 g/cm) or higher, 750 g/in (295 g/cm) or higher, 800 g/in (315 g/cm) or higher, 900 g/in (354 g/cm) or higher, or 1000 g/in (394 g/cm) or higher. Suitably high peel strengths are required of the construct when used in challenging conditions characterized by high and low temperatures, high and low humidity, high UV, and rough handling typical of contemplated military uses.

For conventional polyolefins, it is known that the modulus changes greatly with temperatures, it being typical to see differences of up to 600% from low temperature extremes to high temperatures. Under these conditions, coatings with low bond strength tend to delaminate, especially when subjected to temperature extremes of −30° C. to 60° C. and/or subject to rough and frequent handling. Not only must the bond strength be sufficient to survive the six fold variance in modulus during use, it also must resist delamination caused by water vapor penetrating between the fabric and coating. For these reasons, high bond strengths are required.

To the extent that the fabric constructs of the present invention are extrusion coated, it is contemplated that coatings in the range of 0.5 to 10 mils can be employed. A range of 3 mils to 7 mils is preferred in some embodiments to balance the water vapor transmission rate and the stiffness of the whole structure. As the polymer coating thickness gets higher the "hand" or the softness of the fabric increases and the water vapor transmission rates go down. The extrusion process can be set up in various methods. The polymer blend can be pre-compounded with all resins and additives or they can be blended at the time of extrusion coating as should be understood in the art of extrusion coatings.

A preferred method for applying a breathable polyurethane top coat is different than extrusion coating. Since the water based polyurethane is liquid at room temperature, the top coat is pumped on top of the fabric and the thickness is adjusted by using the "knife over roll" method. The most preferred method for applying a breathable polyurethane is to apply a pre-coat to improve adhesion to the fabric. In an example, the pre-coat is a water based acrylic latex applied in two passes by the knife over roll method. This pre-coat is preferred to foam at a 5:1 ratio. Each pass of pre-coat is at 0.5 oz/sqy, by way of non-limiting example. Following the pre-coat the water based polyurethane coating is applied, for example, at about 3.2 oz/sqy and the whole application is cured by passing through an oven heated up to 340° F.

Porous Fabric:

One objective of the porous fabric is to provide a strong core for the fabric constructs. A high strength to weight ratio is desirable because as the objects being covered get larger the covers designed to go over these objects get heavier and they require more man power and time for placement and removal. Therefore a light weight fabric is desirable. Also, covers made from the fabric constructs of the present invention need to have enough physical strength to provide sufficient protection from the environmental hazards. Military vehicles, navy equipment on board ships and some industrial equipment are often used, transported or stored under undesirable weather conditions such as hail storms, high wind storms or hurricanes. Due to these conditions the fabric composite must be able to withstand tearing or ripping. If any tear or ripping takes place, preferably the fabric construct will be designed so as to limit their spread.

The fabric constructs of the present invention utilize a woven, a nonwoven or a combination of woven and nonwoven fabric as the porous fabric layer to give rise to a so-called core layer. As a non-limiting example, materials suitable for the core layer may be made of organic fibers such as cotton or hemp, or made of synthetic fibers such as Nylon 6, Polyester, or glass fibers. Polyester fabrics have been found to be suitable. The core fabric layer may also be a blend of an organic and a synthetic fiber as well. A non-limiting example of a woven fabric that can be used as the porous fabric layer is a textured polyester fabric named 380 Greige Fabric available through Milliken Company. Depending on the application and the properties of the components of fabric construct other than the porous woven fabric, various weaving patterns of the fabric can be selected for best performance. For example, in some embodiments it has been observed that a twill pattern in the porous fabric increases the rate at which liquid water is wicked through the fabric construct to be released as vapor on the permeable coating side. Other weave types such as plain or satin may be used. In one embodiment, a suitable fabric has a basis weight of 4.5 ounces/square yard and has a tensile strength of 261×205 lbs (Warp×Filling). A preferred fabric would be an 8.5 oz/sqy fabric with a twill pattern. In order to improve physical properties the woven fabric may incorporate "rip stop"; which is a special reinforcing technique that makes a fabric resistant against tearing and ripping. This technique involves reinforcement threads that are interwoven typically 0.2 to 0.3 inches apart and creates a better weight to strength ratio where small tears and rips are less likely to spread. Threads employed for the rip-stop can either by a Nylon 6,6 or a PET fiber, by way of non-limiting example.

A non-limiting example of a commercially available non-woven material suitable for use as the porous fabric core is the Komanda® product by Norafin. Komanda® products can have various basis weights, for example from 185 gsm-210 gsm and may have varying ratios of cotton-to-polyester with an integrated polyamide or PET scrim in the center of it.

Regardless of the material(s) employed for the porous fabric layer, otherwise referred to herein as the core layer, it is preferable that the materials be drapeable, flexible, and be able to hold print. Furthermore the porous fabric needs to provide physical properties such as Tensile Strength and Tear Strength in order to create a strong fabric construct.

Adhesives:

In various embodiments, the invention provides a fabric construct as variously described herein wherein the construct contains a special adhesive component. An adhesive composition is used to apply a soft fiber based material to the porous fabric of the construct. The soft fiber based material in turn is the structure that faces or is in contact with an object to be protected in use of the fabric constructs. The adhesive provides many benefits to the construct, including vapor corrosion inhibition, tear strength, and water/vapor wicking through the construct, to mention some non-limiting examples. In preferred embodiments, the adhesive composition is hydrophilic, it is based on contact adhesives, and is used in a foamed state.

In some embodiments, a single adhesive layer is used. The single layer is preferably a pressure sensitive layer containing VCI and other additives. This is an adhesive suitable for adhering a non-woven fabric fiber layer to the porous fabric layer of the construct. The VCI is optionally encapsulated, for example in a polypropylene shell. In another embodiment, a two part or two layer adhesive is used to adhere the soft fiber based material to the porous fabric. When two layers are used, the first is a non-pressure sensitive layer preferably containing VCI chemistry. In various embodiments, the non-pressure sensitive layer contains a hot melt thermoplastic rubber, also called a hot melt block rubber. It is applied where needed using a conventional hot melt application system. If a pressure sensitive adhesive is required, the hot melt adhesive can contain suitable amounts of tackifiers. Details of the pressure sensitive and non-pressure sensitive adhesive compositions, and of methods of making the compositions, useful for making the constructs of the invention are given in international publication WO2009/143251, the disclosure of which is incorporated by reference.

In one embodiment, a first layer comprising the hot melt is applied to the porous fabric layer. A top layer of adhesive is then added that is preferably foamed, and is an acrylic latex adhesive, in a non-limiting embodiment. The flocked fibers or the non-woven fabric of the soft fiber based material are then applied to the adhesive topcoat.

When desirable to increase the recyclability of the fabric construct, the material of the adhesive can be selected to match the main polymers present in the other layers of the construct. For example, the adhesive material can be based on a polyolefin or polyethylene, especially when the soft fiber layer or the vapor permeable coating composition is of the same material.

Use of an adhesive and especially use of a foamed adhesive has been found surprisingly to contribute to a higher tear strength of the porous fabric on which it is applied and of the construct of which the porous fabric with the applied adhesive is a part. In preferred embodiments, the adhesive composition is rendered hydrophilic by incorporation of titanate or zirconate additives, as described further herein.

The adhesive applied as a foamed adhesive can be an all solids, solvent based or water based adhesive. Non-limiting examples for suitable adhesives are acrylic latex, urethanes and epoxies. The adhesive can be used either straight or foamed. A suitable adhesive is water based acrylic latex adhesive that can be foamed. A closed cell foamed adhesive with air pockets is preferred in some embodiments, as it is believed to improve the overall breathability of the fabric construct. A non-limiting example for a suitable adhesive is 3822 from Key Polymer in Lawrence, Mass.

It is also preferred that the adhesive be further modified to incorporate a titanate or a zirconate coupling agent in order to render the adhesive more hydrophilic, where the water molecules would be attracted towards the adhesive as they are being pulled by the capillary action of the flocked fibers or non-woven fibers of the soft fiber based material. Preferred types of titanates and zirconates are available from Kenrich Petrochemicals as LICA 38J and KR 44. A suitable loading calculation for the titanates is at about 1% of the polymer content plus 0.8% of the solid content in the adhesive. The adhesive is preferred to be further modified to carry a vapor corrosion inhibitor (VCI) package that is designed to be used in a water based system. The corrosion inhibitors are preferably designed in a fashion that they have "multi-metal" corrosion preventative chemistries. In a preferred embodiment, the VCI package is a multicomponent, multimetal package that contains no nitrites or nitrates. An example of a multi-metal corrosion inhibitor package is VCI Powder TS 1335 from Desi Kimya in Istanbul, Turkey. Since the adhesive is preferably in foamed format, the air pockets in the adhesive allow the VCI to volatilize. Furthermore the flock fibers or non-woven fibers of the soft fiber based material create more air between the metal surface and the VCI molecules allowing the VCI to condensate over the metal. The condensation of VCI's allows a better, more uniform coverage of the metal surface, creating effective corrosion prevention. In a preferred embodiment the adhesive will have between 1% and 10% "active" VCI chemistry. The VCI chemistry is more active with the high moisture content. Since the adhesive is preferably a hydrophilic rendered latex adhesive, the moisture captured in the air pockets of the foamed adhesive will improve the effect of VCI chemistry on the covered object. The flocking operation, as will be described in greater detail below, requires heat setting and drying at high temperatures. Some vapor corrosion inhibitors can be heat sensitive by nature. In order to prevent loss of VCI or degradation of these chemistries the vapor corrosion inhibitors can be encapsulated by protective wax polymers such as polypropylene or polyethylene as is known in the art.

It is important that the adhesive remain flexible in cold weather environments. A nonflexible adhesive application, one that has a high glass transition temperature, would turn rigid, thus covers made from the fabric constructs would lose drape-ability.

The overall average thickness of the adhesive layer, including the pre-coat or the top coat combined, ranges from about 0.02 mils to about 4 mils depending on the intended application. Flocked fibers anchor into the adhesive from 10% of its length to 50% of its length. When flocked fibers are used, the adhesive is preferably foamed.

Preferably, the adhesive contains an antimicrobial composition that contains a compounds or mixture of compounds having antibacterial activity. In one embodiment, the antimicrobial composition is dynamic, meaning that it can volatilize by having its own vapor pressure, or it is attached or covalently bonded to the vapor corrosion inhibitor (VCI). In embodiments, the volatile VCI will carry the antimicrobial and make it dynamic. In embodiments, the dynamic antibacterial is carried to the metal surface of the item being protected, where it protects the system from mildew and mold formation. One example of a dynamic antimicrobial composition is one that contains hexamethylenetetramine (Hexamine®) as an antimicrobial compound. In embodiments, it is provided in combination with VCI's selected from primary amines, secondary amines, and triazoles. A static antimicrobial composition is one where the antimicrobial (e.g. mildicide, fungicide) compound(s) is not volatile and it stays within the fabric composition eliminating any microbial—e.g. mold and mildew—growth on the fabric.

Additional examples of the adhesive compositions, and of methods of making the compositions, useful for making the constructs of the invention are given in international publication WO2009/143251, the disclosure of which is incorporated by reference.

VCI Particles

The adhesive compositions also contain vapor phase corrosion inhibitors (VCI). These are provided in powder format, and are dispersed in the adhesive polymer along with the coupling agents. In use, a VCI reaches the surfaces that it must protect from corrosion through the vapor phase. This transport mechanism requires that protective molecules be characterized by having a suitable vapor pressure. In an alternative, a VCI compound reacts with moisture or other system components to generate a volatile species with vapor phase corrosion inhibition properties. In one aspect, vapor phase corrosion inhibitors are volatile chemistries that can be adsorbed on the metal surface. The rate of adsorption of the volatile component and the temperature dependent vapor pressure affects the rate and level of inhibition.

Selection of suitable VCI's is guided by their final application environment and the metals that need to be protected. For examples, mixtures of several different inhibitors are usually called for, since most articles to be protected are made up of different metals and metal alloys. Information on different VCI chemistries for multi metal applications can be found on Reviews on Corrosion Inhibitor Science and Technology, papers given at the CORROSION/89 symposium (NACE Press, 1989), and in particular the paper of G. E. Fodor entitled "The Inhibition of Vapor-Phase Corrosion: a Review" that begins on page II-17-1 the disclosure of which is useful for background information and is hereby incorporated by reference.

Non limiting examples of vapor corrosion inhibitors include: primary, secondary and tertiary aliphatic amines; aliphatic diamines; cycloaliphatic and aromatic amines; polymethylimines; long chain ethanolamines; imidazolines; amine salts, for example those of carbonic, carbamic, acetic, benzoic, oleic, nitrous and chromic acids; acetylenic alcohols; lauric alcohol; alkyl chromates; organic esters of nitrous acid; organic esters of phthalic acid; organic esters of carbonic acid; nitronaphthalene; nitrobenzene; amides; mixtures of nitrites with urea, urotropine, or ethanolamines; naphthols; thiourea derivatives; heterocyclic compounds such as benzotriazole, tolyltriazole, and mercaptobenzothiazole and their respective salts; nitrated or sulfonated petroleum derivatives; and organic acid derivatives.

In various embodiments, it is desirable to incorporate VCI that have antimicrobial and especially antifungal activity. For example, it has been shown that meta-dinitrobenzene inhibits fungal growth, sporulation and pigmentation of fungi including: *aspergillus japonicus, curvularia lunata, penicillium pinophilum, trichoderma* sp., and *cladosporum* sp.

In various embodiments, the VCI in powder format contains particles that are 100% active corrosion inhibitor with no inert carrier. In this situation, the VCI comprises particles that consist of an active corrosion inhibitor or mixture of corrosion inhibitors.

Before incorporation into adhesives in various embodiments, powders of VCI can be mixed with other powdered materials, including powdered materials that do not themselves have the property of being a vapor phase corrosion inhibitor. As non-limiting examples they can be mixed with silica powder to improve handling; or can be mixed with antioxidants and/or UV stabilizers that are used in adhesive manufacturing. In this situation the VCI mixture with the other powder contains particles consisting of the VCI and particles consisting of the other material such as silica, antioxidant, stabilizer, and the like. Vapor corrosion inhibitors suitable for use in the present teachings include those that are available in a powder format at room temperature and at temperatures to which the inhibitors are exposed during manufacture of the adhesive compositions. In a preferred embodiment, the inhibitors are solids at room temperature and remain solids at a temperature up to at least 100° C. The inhibitor components themselves have suitable vapor pressure for releasing from the adhesive in use, or else they are capable of reacting with moisture and/or other components to generate a volatile chemical compound or compounds that can provide the desired corrosion inhibition.

To illustrate sodium nitrite is a suitable VCI, it is a solid up to a temperature above 100° C. Although the invention is not limited by theory, it is believed that NaNO2 provides vapor phase corrosion protection in part by participating in reactions in the presence of moisture and other inhibitors to provide volatile inhibitors such as formaldehyde, ammonia compounds, amides, and the like.

One class of vapor phase corrosion inhibitors is an organic nitrogen base salt of nitrous acid, also referred to as nitrite salts. The organic bases that form nitrite salts are generally selected from amines, guanidines, alkylated imidazolines, nitrosamines, and the like. Examples of nitrites include those of primary amines, secondary amines, tertiary amines, cyclic secondary amines (e.g. piperidines, oxazines, morpholine, thiazolines, thiaoxazines, diazoles, basic diazole derivatives, imidazolines, diazines, basic diazine derivatives, pyrrolidone, basic pyrrolidone derivatives, ureas, thioureas, hydrazines, hydroxylamines, amidines, guanamines, guanidine. In any of the above nuclei, alkyl, cycloalkyl, terpinyl, bornyl, aralkyl, benzyl, phenyl, aryl, and various substituent groups or radicals may be present sol long as the total basicity of the organic nitrogenous compound is sufficient that it can form a nitrite salt by reacting with nitrous acid.

Examples of nitrite salts include those of organic nitrogen bases such as:

1) Primary amines such as: methylamine, isopropyl amine, 2-amino-butane, tertiary butyl amine, 2-amino-4-methyl-pentane, various amyl, hexyl, heptyl, octyl and higher homologous primary amines where the amine group is attached to a secondary or tertiary atom; cyclopentyl amine, alkylated cyclopentyl amines, cyclohexylamine, mono-methyl cyclohexylamines, dimethyl cyclohexylamines, trimethyl cyclohexylamines, other alkylated cyclohexylamines, bornyl amine, fenchyl amine, cycloterpenyl amines, pinyl amine, benzylamine, betaphenylethylamine, alkylated benzylamines, tetrahydro betanaphthylamine, allyl amine, beta-methyl allylamine, beta-chloro allylamine, and their homologs and analogs;

2) Secondary amines such as: di-methyl-, di-ethyl-, di-n-, propyl-, di-isopropyl-, di-butyl-amines; various secondary amines derived from amyl, hexyl, heptyl, oxtyl, and higher homologous alkyl groups; methyl isobutyl amine, N-methyl N-tertiary-butyl amine, N-alkyl N-cyclohexyl amine, N-alkyl N-bornyl amine, di-bornyl amine, N-methyl N-cycloterpenyl amine, N-isopropyl N-(1)-methyl amine, N-alkyl N-benzyl amines and their homologs and analogs; dicyclopentyl amine, di-cyclohexyl amine, alkylated dicyclohexyl amines; dibenzylamine, di-(beta phenyl ethyl) amine; piperidine, piperazine, alkylated piperidines or piperazines; alkylated and unalkylated oxazines such as morpholine and 2,4,4,6-tetramethyl tetra-hydro-1,3-oxazine; alkylated-1,3-thiazolines such as 2,4,4,6-tetramethyl tetrahydro-3-thiazoline;

3) Secondary amine type derivatives of alkylene diamines, such as: $R_1$—NH—$R_2$—NH—$R_3$ wherein $R_1$ and $R_3$ may be like or different aliphatic, alicyclic, aralkyl, alkarylalkyl, heterocyclic, terpenic, radicals, and wherein $R_2$ is an alkylene or cycloalkylene radical. These $R_1$ and $R_3$ radicals for instance, may be isopropyl, butyl, cyclohexyl, benzyl, and/or bornyl radicals. The $R_2$ radical is preferably an ethylene, propylene or tetramethylene radical;

4) Tertiary amines such as: trimethyl amine, triethylamine, tri-n-propyl-amine, tri-isopropylamine, tributylamine, higher homologous and isomeric trialkylamines, variously N-substituted tertiary amines having different organic radicals on the amino nitrogen atom, e.g., alkyl, alicyclic, bornyl, fenchyl, aralkyl, and like homologs and analogs; and tertiary amine type derivatives of alkylene diamines;

5) Quaternary ammonium bases such as, tetramethyl and higher tetraalkyl ammonium bases; trimethyl benzyl-, trimethyl cyclohexyl-, tributyl decyl ammonium bases; various quaternary N-substituted ammonium bases having various organic radicals (of the type described herein) on the quaternary nitrogen atom; pyridinium and alkylated pyridinium or quinolinium quaternary ammonium bases having na alkyl cycloalkyl, or aralkyl group on the quaternary nitrogen atom, including methyl, butyl, cyclohexyl, benzyl groups, and the like homologs and analogs; and 6) Various organic nitrogenous bases, particularly guanidine, alkylated guanidines, alkylated thioureas, and also diazoles, imidazolines, diazines, pyrimidines, and the basic derivatives of these and other organic nitrogenous-base nuclei.

Suitable nitrite salts include without limitation betaphenyl-ethylamine nitrite, piperidine nitrite, 3,3,5-trimethylcyclohexylamine nitrite, trimethylbenzyl-ammonium nitrite, di-isopropylamine nitrite, 2,4,4,6-tetramethyl-tetrahydro-3-oxazine nitrite, cyclohexylamine nitrite, 2-amino-butane nitrite, di-cyclohexylamine nitrite, morpholine nitrite, and dibenzylamine nitrite. Mixtures of nitrite salts can also be used.

As noted, it is usually desirable to provide a mixture of different vapor phase corrosion inhibitors to provide suitable protection for all of the metal or alloys found in the article to be protected. Suitable ferrous inhibitors include for example naphthalene and naphthalene derivatives, alkyl amines, alkyl amine salts, cycloaliphatic amines, dicycloaliphatic amines, dicycloaliphatic amine salts, aromatic amines, nitroaromatic acids, aminol salts, fatty acid quaternary ammonium, urea, thiazoles, benzimidazoles, benzotriazoles combined with tertiary amines, benzotriazoles combined with polyamine, and benzotriazole combined with di(cyclooctyl)amine nitrite.

Similarly, suitable copper metal vapor phase corrosion inhibitors can be selected from, without limitation, dicycloaliphatic amine salts, acetylenic alcohols, phenol carboxylic acids and esters, fatty acid quaternary ammonium slats, thiourea, thiazoles, benzimidazoles, benzotriazoles, benzotriazoles combined with tertiary amines, benzotriazoles combined with polyamines, and benzotriazole combined with di(cyclooctyl)amine nitrite.

In addition, certain corrosion inhibitors have been found suitable for protecting aluminum. These include alkylamines, dicycloaliphatic amines, dicycloaliphatic amine salts, aminol salts, thiazoles, benzimidazoles, as well as combinations of benzotriazoles with tertiary amines, polyamines, or di(cyclooctyl)amine nitrite. Suitable copper corrosion inhibitors include tolyltriazole, benzotriazole, and mercaptobenzothiazole, as well as their salts.

Another class of vapor phase corrosion inhibitors includes the salts of carboxylic acids such as benzoic acids or aliphatic carboxylic acids of about 3-20 carbon atoms. Suitable salts include ammonium, alkyl ammonium, sodium, and the like.

A vapor phase corrosion inhibitor suitable for use in the compositions generally shows a vapor pressure of at least $10^{-6}$ ton, at least $2 \times 10^{-5}$ ton, or at least $10^{-4}$ ton. Inhibitors with too high a volatility and vapor pressure are avoided if the inhibitors themselves are solids at room temperature or at temperatures up to 100° C. or higher. In this way, the vapor phase corrosion inhibitors are provided as solids or powders that can be formulated into the adhesive with the use of the titanate, zirconate, or silane coupling agents as further described herein.

Vapor phase corrosion inhibitors are incorporated into adhesive compositions at levels sufficient to supply the adhesive composition with vapor phase corrosion inhibitor properties during use in wrapping the protected articles. In various embodiments, suitable vapor phase corrosion inhibition by the adhesive compositions is measured by a "pass" rating for respective metal (iron, copper, aluminum, zinc, etc.) in an industry standard vapor phase corrosion test. Thus, suitable vapor phase corrosion inhibitors include those chemical compounds that, when formulated into an adhesive composition as described herein or when formulated for other anti-corrosion uses, result in a "pass" rating in standards such as the German standard TL-8135-002; as well as MIL-PRF-22019E.

In various embodiments, the corrosion inhibitors can be provided as a part of a masterbatch, where the masterbatch is made of the VCI material and a carrier or carriers. Such a masterbatch as part of a proprietary composition sold by suppliers of VCIs and can be produced by spray drying, by way of non-limiting example. Designation of the particles as a "VCI powder" reflects the physical nature of the resulting VCI composition. In various embodiments, the carrier polymers are made of thermoplastic elastomers or other block copolymers, as long as they are compatible with the matrix. For recyclability, the polymeric carriers can be based on a polymer that is largely ethylene based.

VCI in particle or powder form is formulated into adhesive formulation at a level sufficient to provide suitable corrosion protection in use. In general, levels of 0.1-20% by weight of the particles are suitable in most applications. In some embodiments, the VCI particles are incorporated at a level of about 5% to about 15% by weight, based on the total weight of the adhesive composition. The VCI additive can be a blend of multiple corrosion inhibitors such as a combination of dicyclohexylamine nitrite, ammonium benzoate, morpholine, sodium benzoate and benzotriazole. Other examples include mixtures of benzotriazole with benzoates of ammonia, guanidine, and hexamethylene-diamine; and a mixture of benzotriazole with guanidine benzoate and ammonium benzoate In addition to vapor corrosion inhibitors, other materials which may be added to the adhesive layer and which form a protective or treating vapor in the cavity enclosed by the wrapping material include anti-stats (static electricity removers and dissipaters), antioxidants, antimicrobials (to protect the product from bacteria and other biological contaminants), acid neutralizers, acid or bases (to effect pH changes), fragrances, additives that, when exposed to air, change color, thus indicating that the product has been tampered with, and others.

The VCI powder and the adhesive can be mixed together in a batch process. During the batch process, adhesive is placed in a mixer and the VCI powder—either separately or in a form pre-combined with a titanate and/or zirconate coupling agent as described herein—is placed slowly in the mixer in pre-set percentages. While a batch system produces acceptable results, it has been discovered that improvements in uniformity and reproducibility are achieved through the use of a continuous process, conveniently carried out in an extrusion apparatus such as a twin screw extruder.

The continuous process also produces adhesives of more uniform viscosity, which tends to minimize the need to run the downstream lamination process at variable temperatures to adjust for the higher or lower viscosity of test samples. Vapor corrosion inhibitors are heat sensitive by their nature. When the temperature is elevated there will be increase in the VCI release to the environment. So when higher temperatures are used during the lamination process, there could be a higher rate of VCI loss to the environment. It is generally preferred to run the lamination process at a consistent temperature and preferably as low a temperature as possible.

Coupling Agents

As noted, another step to improve product uniformity and to gain some of the lost viscosity characteristics of the hotmelt adhesive is to use various titanium and/or zirconium (Ti/Zr) coupling agents. Although the invention is not to be limited by theory, it is believed that esters of titanium or zirconium couple or chemically bridge two dissimilar species such as inorganic filler/organic particulate/fiber and an organic polymer through proton coordination. Proton coordination may be interpreted as a form of plasticizing, since the filler is being modified to act more like the matrix resin. Under melt compounding shear conditions, the titanate and/or zirconate assists in the removal of air voids and moisture from the particle surface, resulting in complete dispersion and formation of a true continuous phase, thus optimizing filler performance.

Titanates and Zirconates

In various embodiments, the coupling agent includes at least one compound selected from the group of compounds consisting of a titanate containing compound, a zirconate containing compound, and mixtures thereof. Examples include ethylenically unsaturated titanate containing compound and neoalkoxy titanate containing compounds. Non-limiting examples and their commercial designations from Kenrich Petrochemcials, Inc. include tetra (2,2 diallyloxymethyl)butyl-di(ditridecyl)phosphito titanate (KR 55), neopentyl(diallyl)oxy-trineodecanoyl titanate (LICA 01), neopentyl(diallyl)oxy-tri(dodecyl)benzene-sulfonyl titanate (LICA 09), neopentyl(diallyl)oxy-tri(dioctyl)phosphato titanate (LICA 12), neopentyl(diallyl)oxy-tri(dioctyl)pyro-phosphato titanate (LICA38), neopentyl(diallyl)oxy-tri(N-ethylenediamino)ethyl titanate (LICA 44), neopentyl(diallyl)oxy-tri(m-amino)phenyl titanate (LICA 97), neopentyl(diallyl) oxy-trihydroxy caproyl titanate (LICA 99), and mixtures thereof.

Further examples of coupling agents include ethylenically unsaturated zirconates and neoalkoxy zirconate containing compounds. Non-limiting examples from Kenrich include (2,2 diallyloxymethyl)butyl-di(ditridecyl)phosphito zirconate (KZ 55), neopentyl(diallyl)oxy-trineodecanoyl zirconate (NZ 01), neopentyl(diallyl)oxy-tri(dodecyl)benzene-sulfonyl zirconate (NZ 09), neopentyl(diallyl)oxy-tri(dioctyl) phosphato zirconate (NZ 12), neopentyl(diallyl)oxy-tri(dioctyl)pyro-phosphato zirconate (NZ 38), neopentyl(diallyl) oxy-tri(N-ethylenediamino)ethyl zirconate (NZ 44), neopentyl(diallyl)oxy-tri(m-amino)phenyl zirconate (NZ 97), neopentyl(diallyl)oxy-trimethacryl zirconate (NZ 33), neopentyl(diallyl)oxy-triacryl zirconate (NZ 39), dineopentyl(diallyl)oxy-di-p-aminobenzoyl zirconate (NZ 37), dineopentyl(diallyl)oxy-di(3-mercapto) propionic zirconate (NZ 66A), and mixtures thereof.

Exemplary titanates include LICA 38J and LICA 09 from Kenrich Petrochemicals Inc. It has been discovered that use of the Ti/Zr coupling agents improves the compatibility of UV stabilized adhesive such as SEBS with the VCI powder and achieves the required overall flow characteristics for the final adhesive.

The Ti/Zr coupling agents are added to the adhesive at levels sufficient to obtain the noted advantages. In various embodiments, at least 0.1%, at least 0.2%, at least 0.4%, or at least 0.5% by weight is added, relative to the weight of the VCI. In various embodiments, up to 5% or up to 6% are used, where all percentages are by weight based on the weight of the VCI. Thus in various embodiments, the adhesive contains 0.1-6%, 0.1-5%, 0.5-6%, or 0.5-5% of the Ti/Zr coupling agent, where the percentages are based on weight of the VCI particles.

In compounding, the Ti/Zr coupling agents can be added to the adhesive separately from the VCI particles, but at the noted weight ratios relative to the VCI. Alternatively or in addition, the VCI powder can be first combined with the coupling agent, and the resulting so-called "titanated" or "zirconated" VCI added as a single component to the adhesive. Thus, in one embodiment, VCI powder is sprayed with the Ti/Zr chemistry between 0.5% and 6.0% by weight to provide better compatibility between the VCI powder and the adhesive. Titanated VCI powder is termed VCI(T) in the Examples below.

Silanes

In various embodiments, the coupling agents are selected from those classified as silanes.

Examples of amino functional silane coupling agents include aminopropyltriethoxysilane; aminopropyltrimethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethylaminoethyl)methyldiethoxysilane; and methylaminopropyltrimethoxysilane.

Examples of sulfur functional silane coupling agents include bis(triethoxysilylpropyl)tetrasulfide; bis(triethoxysilylpropyl)disulfide; bis(3-ethoxydimethylsilylpropyl)oligosulfur; mercaptopropyltrimethoxysilane; mercaptopropyltriethoxysilane; mercaptopropylmethyldimethoxysilane; and 3-thiocyanatopropyltriethoxysilane.

Examples of epoxy silane coupling agents include: glycidoxypropyltrimethoxysilane; glycidoxypropyltriethoxysilane; glycidoxypropylmethyldiethoxysilane; and glycidoxypropylmethyldimethoxysilane.

Examples of (meth)acryl silane coupling agents include: methacryloxypropyltrimethoxysilane; methacryloxypropyltriethoxysilane; and methacryloxypropylmethyldimethoxysilane.

Examples of chloro silane coupling agents include: chloropropyltrimethoxysilane; chloropropyltriethoxysilane; chloromethyltriethoxysilane; chloromethyltrimethoxysilane; and dichloromethyltriethoxysilane.

Examples of vinyl silane coupling agents include: vinyltrimethoxysilane; vinyltriethoxysilane; and vinyltris(2-methoxyethoxy)silane.

Tackifiers

While non-pressure sensitive adhesives find use in various embodiments, in other embodiments the adhesive compositions contain tackifiers (also called "tackifying agents"). Due to addition of fillers in a hot melt adhesive, the base adhesive tends to lose some physical properties, like any other polymer that contains fillers. For example, when the VCI powder is added to the hot melt adhesive, the adhesive tends to lose "tack." Tack is an important property for laminations, both for "initial tack", which bonds the two surfaces together, and for the life of the laminate so the laminate does not delaminate over time during its life cycle. In order to make up for the loss of tack, one solution is to increase the amount of adhesive put into a laminate used to match a "similar" bond strength, that would be achieved with an unfilled adhesive. A suitable tackifier is Regalrez 1018 supplied by Eastman Chemical.

Also adding tackifying agents can act as a encapsulating agent. In a mixture of components having different viscosities, a component of lower viscosity has a marked tendency to encapsulate the second component in binary blends. Thus in various embodiments, tackifiers of low viscosity are added to encapsulate the adhesive containing dispersed corrosion inhibitors. A suitable tackifying agent has a viscosity of 10 poise or less at 60° C. Other suitable tackifying agents are characterized by a viscosity of 100 poise or less at 40° C. and/or by a viscosity of 1000 poise or less at 30° C. Regalrez 1018 is an example of a tackifying agent having viscosity within these parameters.

In various embodiments, resins useful as tackifying agents are low molecular weight amorphous polymers and they are widely used to make adhesives to generate tack and specific adhesion. The resins are of three main groups in the industry: Rosin Resins, Terpene Resins and Hydrocarbon Resins. Examples of hydrocarbon resins include C5 aliphatic resins, C9 aromatic resins, and cycloaliphatic resins (such as dicyclopentadiene or DCPD resin). Hydrogenated resins of C9, C5 and/or DCPD resins are also suitable. The hydrogenated resins increase the outdoor usage of the finished adhesive. Compatibility of tackifying resins with the matrix polymers in the adhesive is important to achieve a good product. Color, softening point, molecular weight, glass transition temperature, melt viscosity, thermal stability and polarity of the resins are other criteria to consider for adhesive applications. For a discussion of tackifying agents, see for example www.specialchem4adhesives.com; "Chemistry of Tackifying Resins Part I, Part II & Part III" the content of which is useful for background information and is incorporated by reference. Regalrez 1018 has proved to be a good candidate as far as compatibility since it is rated to be compatible with various chemistries such as polyethylene, polypropylene, ethylene-propylene copolymers, natural rubber, EPDM, butyl rubber, SIS and SEBS blocks.

When the VCI adhesive is manufactured by a twin screw method, it is possible and preferable to add tackifying resins in screw zones downstream from addition of the VCI particles and coupling agents. In various embodiments, the tackifying resins are saturated hydrocarbon resins, hydrogenated synthetic polyterpenes, natural hydrogenated terpenes, and the like. Suitable tackifying resins are described for example in U.S. Pat. No. 5,204,390, the disclosure by which is incorporated by reference. Further suitable examples include hydrogenated aliphatic petroleum hydrocarbon resins, aromatic hydrocarbon resins, and hydrogenated derivatives thereof. If desired, mixtures of two or more tackifying resins can be added. Other suitable tackifying resins include hydrocarbon, (e.g. C5 to C9) resins, polyterpenes, and rosin esters of pentaerythritol and glycerol. In various embodiments the tackifiers can be added to reduce viscosity and/or improve wetting.

In various embodiments, the adhesive compositions contain from about 1% to about 15% tackifying resin, from about 5 to about 10%, or from about 5 to about 7% tackifying resin, based on the total weight of the adhesive composition. In certain embodiments, the base adhesive used to formulate the compositions already contains a certain percentage of tackifying resin as part of the commercial product being used. In such embodiments, the downstream blending of additional tackifying resins is reduced by a corresponding amount.

The tackifying agent is preferably added downstream of the VCI particle, and is added at a relatively low shear for a relatively short time to avoid too high a degree of mixing or miscibility into the adhesive. It is believed that the relatively low degree of mixing of the tackifier leads to encapsulation of the particles in the composition, making the tackifier act as a shell. This tends to increase the pressure sensitivity of the adhesive (desirable for downstream use in lamination processes) while at the same time decreasing the viscosity or at least avoiding an unacceptable increase in viscosity, which is also desirable for downstream processing. In one aspect, the invention is characterized by an adhesive containing added tackifying agent (tackifier) that has a melt index or viscosity no higher than the adhesive before addition of the tackifying agent.

Foaming Agent

A foaming agent can be added to the adhesive composition. In a continuous process for formulating the adhesive, the foaming agent is preferably added downstream of addition of the VCI particle and coupling agent. Alternatively, foaming agents can be added to the adhesive compositions in a continuous process during lamination or adhesive coating.

Foaming agents contain an active ingredient that produces a gaseous decomposition product when subjected to an activating temperature, which is a characteristic of the agent. In various embodiments, it is preferred to use a foaming agent that will not be activated during compounding in any of the stages described herein, but that will decompose to provide volatile blowing agent at a later temperature of lamination during which the adhesive composition is applied to a substrate. In a non-limiting embodiment, a foaming agent is selected that has a decomposition temperature of 140° C. or higher, for example from 140-150° C. A suitable foaming agent is Celogen® 780, an activated azodicarbonamide sold by Crompton and having a decomposition temperature of 140-150° C. It can be formulated in the continuous process described herein at temperatures below 140° C. in all the stages, and subjected to temperatures of 140-150° C. in a subsequent lamination process to foam the adhesive.

Flocking

In general, flocking involves a substrate, an adhesive and flock grade—short cut—fibers. U.S. Pat. No. 2,675,330 (Schwartz, 1946) and U.S. Pat. No. 4,459,332 (Giglia & Rye, 1984) provide some initial background on flock processing and application information.

According to the teachings of the present invention the porous fabric serves as an appropriate substrate.

Flock fibers can be randomly cut or precision cut and can range in length from 0.25 mm to 25 mm, from 0.25 to 23 mm, from 0.25 mm (about 9-10 mils) to about 20 mm (about 760 mils), from 0.25 mm to 10 mm, or from 0.25 mm to 5 mm. They can be in any shape, such as round, trilobal, and dog-bone, for example. Flock fibers can be synthetic or organic; non-limiting examples of common flock fibers are nylon, polyester, rayon, acrylic, cotton, and the like. The fibers can be from 0.5 to 90 denier. The fibers anchor into the adhesive from 10% of its length to 50% of its length; 10% is more preferred for this application. The flock fibers create a soft-to-touch surface, yet are able to withstand degradation caused by wear against surface contact over time. By design the flock fibers will not damage painted surfaces.

Preferably, the flock fibers employed will help wick water or other solvents away from the surface being protected, by use of capillary action. The water gets pulled away from the surface of the article over which the fiber construct is employed by the flock fibers. Water or other solvents pass through the flock fibers and they are pulled towards the hydrophilic adhesive coating, acting as a bladder. From there the porous fabric or nonwoven helps to push water from the foam adhesive to a lower moisture content polymeric coating. Working in synergy all the parts act as a gradient force to keep water away from the surface of the object to allow further corrosion prevention.

Flocking the porous fabric layer involves several steps. The substrate gets coated with an adhesive at desired coating levels; then flock fibers are embedded in the adhesive using electrostatic and mechanical forces. The electrostatic force field aligns the flock fibers substantially perpendicular to the surface of the fabric layer. The adhesive is then cured with heat or by other means—UV, electro-beam etc.

The adhesive coating methods on the substrate can utilize a variety of methods including knife coating, curtain coating, reverse roll coating, gravure coating and rotary screen coating, by way of non-limiting example.

Having a flock on at least one side of the porous fabric allows the finished cover to drag across rough surfaces without snagging the fabric or sacrificing any fibers. In some applications, the use of loose fibers such as nonwoven fibers instead of flock fibers, could lead to snagging of the fibers on the rough surface of the object being protected such as the tank shown in FIG. 3. The snagging fibers would tend to sacrifice themselves as the fabric construct is being pulled across that surface. The flock fibers allow the fabric construct to "glide" over rough surfaces with limited sacrifice of the fibers and/or tearing or ripping of the fabric construct as its being pulled over a rough surface. The fibers dissipate the energy from the movement when the cover moves on the surface.

The flock fibers are preferably heat set, where the flock fiber is heated to its crystalline state and formed into a certain shape. This gives the fiber a memory and the return to the ideal orientation. This helps prevent the fiber from being crushed during the extrusion process when the breathable polymer is coated on the fabric. It also allows faster recovery of the orientation after the cover is folded up.

The orientation of the fibers, electro-statically and/or mechanically, in a substantially perpendicular manner to the substrate also helps with moisture removal process from the surface. The fibers help to wick water away from the surface being protected, as they act as straws to pull water towards the cover. As the water moves towards the adhesive, it is pulled further out; working in conjunction with the breathable coating.

Non-Woven Fabric for the Soft Fiber Layer

In an alternative embodiment, the soft fiber layer facing the object to be protected in use is a non-woven fabric with suitable properties of softness, hydrophilicity, water/vapor wicking ability, material compatible during construction or recycling, etc. Fibers are made from a suitably soft material, such as a polyester or polyolefin fiber. In a preferred embodiment, the non-woven fabric contains polyethylene fibers. Further detail on the nature of preferred fibers, and the construction of the soft fiber layer follows.

Further details of a non-woven fabric for use as the soft fiber material layer of the constructs of the invention are given in international publication WO 2010/022066, the disclosure of which is incorporated by reference.

In an embodiment, polyethylene fibers for the non-woven fabric are provided that combine a small denier size (e.g., 1-3 denier or 0.5 to 2 denier) with a heat distortion or heat deflection temperature higher than 70° C., such that the fibers are suitable for the spinning, carding, and other procedures needed in order to make the nonwoven fabrics described herein. In various embodiments, polyethylene fibers with 1-3 denier have a heat distortion temperature greater than 70° as measured by ASTM D 648 at a load of 455 kPa. In one embodiment, the fibers are made of LLDPE. The fibers in various embodiments are further characterized by one or more of the following:

- the fibers are of 1 to 1.3 denier;
- the fibers are of 1.3 to 1.7 denier;
- the fibers are in the form of a crimped staple fiber;
- the fibers contain 0.5-6% by weight nanoclay; optionally the nanoclay is coated with titanate, zirconate, or silane coupling agents;
- a nonwoven fabric is made from the fibers;
- the nonwoven fabric comprises two or more layers wherein the fibers in the first layer are different denier than fibers of the second layer, when the first and second layers are adjacent;
- a fabric comprises two or more layers and the fibers of a first layer have a different hydrophilicity than fibers of a second layer, when the first and second layers are adjacent;
- a fabric is a multilayer fabric wherein fibers of a first layer differ from fibers of a second layer in both denier and hydrophilicity;
- a layer of the fabric characterized by fibers of a higher denier is also characterized by fibers of higher hydrophilicity;
- a first layer of a nonwoven fabric comprises fibers of 1 to 1.3 denier and a second layer of the fabric comprises fibers of 1.3 to 1.7 denier;
- the fibers of the nonwoven fabric comprise a hydrophilic titanate or zirconate coupling agent material;
- the fibers in one or more layers of the nonwoven fabric contain nanoclay particles to improve HDT;
- fibers of higher denier in a multilayer nonwoven fabric comprise the hydrophilic titanate material;
- a first layer of a multilayer nonwoven fabric comprises fibers of 1 to 1.3 denier and a second comprises fibers of 1.3 to 1.7 denier; and at least the fibers of the second layer further comprise a titanate or zirconate coupling agent;
- the fabric is made by a spun-bond method;
- the fabric is made by a melt blown method;
- the fabric is made by a spun-laced method
- the nonwoven fabric has an areal weight of 10 to 200 grams per square meter;
- a laminate is provided comprising any of the nonwoven fiber aspects shown above;

Low Denier Polyethylene Fibers

In various aspects, polyethylene fibers are to be used in the nono-woven fabric of the soft fiber layer because they are soft compared to other polymers. This gives the construct the advantage of not scratching the object to be protected. However, conventional polyethylene fibers tend to have insufficient heat deflection temperature and other physical properties, and in general lack the temperature stability for manufacture and use in the contemplated applications. In particular, conventional polyethylene fibers generally do not tolerate the heat generated during spinning. As staple fibers, they cannot be crimped, and/or tend not to survive the temperatures of the carding procedures. Further, because of their low heat distortion temperature, they tend not to tolerate conventional needlepunching or hydroentangling processes for nonwoven web formation. As such, they must be formed into webs by melt bonding or other processes that introduce points of bond. These points can scratch a sensitive and defeat the purpose of using soft polyethylene fibers.

The drawbacks are overcome by adding components that increase the heat deflection temperature. The fibers can then be used as stable or filament to prepare non-woven fabrics. The components include oxidation and UV stabilizers, as well as fillers such as nanoclay; and nucleating agents known for use in polymers generally but until now not taught for use in polyethylene fibers. In particular, low denier polyethylene fibers (for example, fibers of 1-3 denier) are produced by spinning (extruding through spinnerets) a melt that contains
1) a polyethylene polymer or copolymer;
2) a stabilizing package that can contain
    a) a primary antioxidant;
    b) a secondary antioxidant; and/or
    c) a UV stabilizing package such as a HALS (hindered amine light stabilizer); and
3) a nucleating agent; and
4) a clay or nanoclay The low denier polyethylene fibers are characterized by heat deflection temperature (HDT) greater than 70° C., when measured by ASTM D648 at a load of 455 kPa.

The primary and secondary antioxidants and the UV stabilizing package (items 2a-2c) provide protection against oxidation and damage caused by ultraviolet radiation. The nucleating agent helps to control the crystallinity and, it has been found, the heat distortion temperature of the fiber. In various embodiments, the nucleating agent is selected from those of a type conventionally used to control crystallinity and nucleation in casting of polyethylene films. An example is Hyperform® HPN-20E, sold by Milliken. Chemically, the HPN-20E nucleating agent is said to be a carboxylic acid salt. The clay is a layered material such as an aluminosilicate that can be dispersed or exfoliated into the polyethylene. Because the flakes when exfoliated have dimensions on the order of a few tens of Angstroms, the clays can be referred to as a nanoclay. That is, nanoclay refers to the dimension of the exfoliated particles.

Primary antioxidants (also called free radical scavenging antioxidants) inhibit oxidation using chain-terminating reactions. In various embodiments, they have reactive OH or NH groups. Non-limiting examples include hindered phenol antioxidants and secondary aromatic amine antioxidants. Inhibition of oxidation occurs via a transfer of a proton from the antioxidant to a free radical species formed in a polymer chain. The radical resulting from the proton transfer is stable and does not extract a proton from the polymer chain.

Secondary oxidants (also referred to as hydroperoxide decomposers) decompose hydroperoxides into non-radical, non-reactive and thermally stable products. Secondary antioxidants are often used in combination with primary antioxidants to yield synergistic stabilization effects. In action, secondary antioxidants prevent the split of hydroperoxides into reactive alkoxy and hydroxy radicals. Commonly used secondary antioxidants include organophosphorous compounds and thiosynergists. Thiosynergists are sulfur-based hydroperoxide decomposers. Non-limiting examples include esters of 3,3-thiodipropionic acid. The thiosynergists react with a hydroperoxide to generate sulfoxides and sulfones. Sulfur-based hydroperoxide decomposers can be used in combination with hindered phenol antioxidants. The most common commercially available thiosynergists are based on either lauric or stearic acid.

Nucleating agents are compounds or compositions that function by increasing the temperature at which crystallization from the melt begins. In determining or assessing the effect of the nucleating agent, the onset of crystallization can be determined by differential scanning calorimetry (DSC). The amount of nucleating agent to be added to the polyethylene fibers is an amount suitable to raise the crystallization temperature of the melt by at least 1° C. compared to that without any nucleating agent. That is, a measurable rise in the crystallization temperature from using the nucleating agent tends to correlate to, or be a proxy for an increase in heat deflection temperature of the fiber. The minimum, maximum, or optimum amount of nucleating agent can be determined in individual cases from correlations of the levels added to the desired outcome (i.e., raising the crystallization temperature of the polymer and/or the deflection temperature of the fiber). In this aspect, the formulation is not dependent on an individual chemistry, but on the power of that chemistry to provide the needed increase in the crystallization temperature.

Incorporation of the clay or nanoclay into the polyethylene resin results in an exfoliated composition, wherein layers of clay are dispersed homogenously throughout the fiber matrix. Exfoliation of clay into the polyethylene results in a so-called nano-composite. To achieve complete exfoliation into the polymer resin, the clays are pre-treated with various coupling chemistries, a compatibilizing resin can be used along with the polyethylene, and/or the clays are dispersed into the nano-composite by agitation, ultrasound, grinding, and the like.

Suitable clays include aluminosilicate, which have a sheet-like (layered) structure, and contain silica $SiO_4$ tetrahedra bonded to alumina $AlO_6$ octahedra in a variety of ways. Suitable clays include the smectite clays, which have a 2 to 1 ratio of tetrahedra to the octahedra. A non-limiting example of a smectite clay is montmorillonite. In such clays, the thickness of the layers (platelets) is of the order of one nanometer. When dispersed or exfoliated, the aspect ratios of the platelets are high, typically 100-1500. The exfoliated clays have very high surface areas up to hundreds of square meters per gram. Normally, it is necessary to modify the clay to make it chemically compatible with the polymeric matrix. A variety of processes is known to make the clay "organophilic." Ion exchange with the clay, as well as the use of dispersing polymers are two such processes. Two examples of nanoclay are Closite Na+ and Closite 15A by Southern Clay Products.

In various embodiments, the clays are dispersed or exfoliated into the polymer resin after pre-treatment with coupling agents such as the titanates and zirconates described further herein.

In various embodiments, the nanoclay incorporated into the polyethylene matrix is provided at a treat amount of 0.25-15% by weight, 0.5-10% by weight, 0.5-9.0 percent by weight, 0.5 to 6.0% by weight, or 2-8% by weight. Process conditions are selected in order to form an exfoliated structure, wherein the layers of the clay have been completely separated and individual layers are distributed throughout the organic matrix.

In a non-limiting example an LLDPE fiber grade resin, such as ASPUN™ 6835A or ASPUN 6850A (two fiber grade polyethylenes produced by Dow Chemical and differing in melt flow index) is used. The fiber resin is modified before being converted into fibers, to improve the heat distortion temperature by adding anti-oxidants (e.g. IRGANOX B215), and UV stabilizers (e.g. TINUVIN 111). The heat and UV stabilizing package generally make up no more than 1.0% by weight of the resin to be made into fibers for the nonwoven. Furthermore the resin can be nucleated by adding a nucleating agent such as Miliken's Hyper-Form® HPN-20E, conveniently by way of a masterbatch. This step raises the crystallization temperature and has been observed to increase the heat distortion temperature (HDT) of the resulting fibers. Finally, a nanoclay such as montmorillonite is exfoliated at a level of about 1 to 15% by weight into the polymer matrix. Addition of these packages raises HDT of the fibers and makes them suitable both for production and post-production of the laminate. That is, through the use of appropriate additives at appropriate levels the heat distortion temperature can be raised by several degrees Celsius and preferably to a final value of 70° C. or higher (e.g., 70-80° C., 70-90° C., or 70-100° C.).

Optionally the fiber resin is modified with a titanate or a silane chemistry to enhance the physical characteristics of the fiber during converting and post-lamination.

Crimped Fibers of Polyethylene

Crimped staple fibers made of polyethylene are prepared by
  extruding a molten blend of the ingredients above through spinnerets;
  dressing the extruded fiber, for example with a silane,
  cutting and crimping the fiber to make a coiled fiber, and
  thermally setting the crimped fiber.

Before thermal setting, a low level of surface crosslinking can be applied to the fiber. It has been found that fibers made as discussed herein have sufficient heat distortion properties to withstand the temperature of crimping and thermal setting to produce a crimped fiber suitable for formation of a nonwoven web by needlepunching or hydroentangling.

Non-Woven Fabrics Used Opposite the Vapor Permeable Polymer Composition in Particular Embodiments Nonwoven fabrics for use as the layer directly facing the object to be protected in the constructs described herein are made of suitable fibers that provide for transport of water vapor toward the interface and thence through the porous fabric and the vapor permeable layer into the outside environment. Non-limiting examples include polyester and acrylic fibers. In a particular embodiment, the nonwoven fabric is fabricated from polyethylene fibers. For use in the constructs, the polyethylene fibers are preferably treated to increase their heat deflection temperature, as discussed in an earlier section of this disclosure.

The nonwovens of the present invention can use fiber sizes in the microfiber range of 3.0 denier or less, more preferably from 1.0 denier to 2.5 denier or a combination of these sizes. Optionally the fibers used can be hollow to help with the flow of vapors and/or gases as stated in U.S. Pat. No. 4,838,904 which is hereby incorporated by reference.

The fibers for the present non-wovens are provided as filaments or as staple fibers. Fibers in the form of filaments can be spun-bond, melt blown, or air laid to provide non-woven webs. In making a multilayer non-woven fabric according to the invention, the individual webs can be co-extruded to provide fabrics having the desired vapor permeability and wicking capabilities.

Staple fibers are normally crimped before further processing to make the non-woven fabrics.

In various embodiments, crimped staple fibers are carded into multiple layers, wherein the individual layers have the hydrophilicity and vapor wicking, liquid wicking, hydrophilicity, and vapor permeability properties further described herein.

In various embodiments, the successive cards are laid parallel (i.e. at the same angle, usually the machine direction) or at different angles (e.g. perpendicular to one another). After all of the cards are laid down, a non-woven fabric can be made by hydroentangling, needle punching, and the like. Alternatively, staple fibers can be spun flashed. If cards are laid down in different directions and preferably in a perpendicular fashion—for example a first card laid down in the machine direction (MD) and a second card at 90° in the transverse direction (TD)—a web is produced having higher strength in the machine direction, which is preferred for stretch applications.

The fibers, modified as described above to provide suitably high HDT, are made into a web by suitable processes such as spun laid and melt blown. An example is a spunbond/melt bond/spunbond web (SMS). In one embodiment the fibers are cut and crimped into a staple fiber and then formed into a web by carding. Any combination of these methods can be used depending on the manufacturing capabilities to create a multilayer nonwoven structure. After the web formation, the nonwoven can be bonded together by one or a combination of many methods known in the art, including but not limited to: chemical bonding (wetlaid), needlefelt, needlepunching, ultrasonic pattern bonding, and hydroentangling.

In various embodiments, nonwoven fabrics are produced from low denier crimped polyethylene fibers by setting down at least two layers of fibers, followed by needle punching or hydroentangling the fibers to make a fabric. By making the fabric with needle punching or hydroentangling, any step of melting the fibers is avoided. For some applications, this is advantageous because melting the fibers would provide a "point of bond" where the fibers melt and coalesce, and this point of bond would tend to scratch the surface of a sensitive object that is being protected by the laminate. However, the needle punching or hydroentangling steps subject the fibers to challenging conditions that require high heat distortion temperature and other physical properties provided by the fiber compositions. Also, for best entangling by needle punching or water jets, the fibers should be crimped, which subjects them to further high temperature and challenging manufacturing steps that conventional polyethylene fibers have until now been unsuited for.

In various embodiments, the nonwoven fabric has a multilayer structure such as a three layer structure or a two layer structure. Depending upon the application, the multilayer nonwoven can be modified by a scrim material as stated in U.S. Pat. No. 6,696,120 B1, the disclosure of which is incorporated by reference. In various embodiments, a multilayer fabric has different size fibers in its individual layers to take advantage of dissimilar wicking characteristics of these fibers. In particular, lower denier ("smaller") fibers are used in the "bottom" layer of the multilayer nonwoven fabric that is in contact with the object or volume to be protected when the fabric construct is in use as a protective wrap. Smaller size fibers tend to wick water at a faster rate than larger fibers. The smaller fibers wick at a faster rate at the surface and turn the hydrostatic pressure into a hydrokinetic pressure towards the upper layer of the nonwoven. The upper layer is normally made of larger fibers.

In a preferred embodiment, the fibers are laid sequentially in at least two layers to make the fabric. The two or more layers contain fibers of different denier. The low denier fibers have higher capillary action than the higher denier fibers. As such, the high capillary fiber layer is preferably disposed in use toward the side subject to a high relative humidity that needs to be controlled or the water removed.

When the fiber is in the form of a filament, the layers are separately formed (by spun bond, melt blown, or air laid processes for example) and coextruded to form a multilayer nonwoven fabric. With staple fibers, the multilayer non-woven fabric is normally formed by laying individual fibers in separate cards, followed by needle punching or hydroentangling to form the non-woven fabric. Various embodiments involving multilayer non-wovens will be described herein referring to layers of fibers. It is to be understood that, where appropriate, the teachings about the layers refers to cards formed from crimping staple fibers or to layers formed from filament fibers.

In an embodiment, the first layer is made of 1.1-1.3 denier, and the second layer is 1.3-1.7 denier. Depending on the application a wide variety of areal weights of the fibers can be provided in each layer. In various embodiments, 10-70 g/m$^2$ are provided in each layer. In a preferred embodiment, the nonwoven fiber has a total areal weight of about 50 g/m$^2$.

As noted, one function of the low denier fiber is to wick water away from the surface or the volume being protected. Once the water is wicked away from the surface by the low denier fibers of the first layer, the water enters the higher denier layer. In order to continue the water in the path away from the protected surface, the second layer of fibers is treated so as to be more hydrophilic than the low denier high capillary fibers. In this way, the water is led irreversibly in a direction away from the surface (or volume) being protected.

In preferred embodiments, the higher denier fibers of the second layer are formulated with components or other treatments to make them permanently hydrophilic. For example, the fibers of the second layer are formulated with specifically hydrophilic titanate coupling agents. This renders the fibers permanently hydrophilic. Two examples of hydrophilic titanates available through Kenrich Petrochemicals Inc. are LICA38J and NZ38J. LICA38J is characterized as soluble in water; and NZ38J is soluble in water at concentrations equal to, or less than 1%. Suitable coupling agents include those described below in the section on adhesives.

In preferred embodiments, the fibers of one or both of the layers contain fillers such as talc or clay, which acts to make the fibers cheaper and which acts as a heat sink, increasing the temperature stability of the fibers.

In an illustrative embodiment, a multilayer nonwoven fabric contains a first layer of smaller denier fibers and a second layer of larger denier fibers, with the fibers of both layers preferably being in the range of 1-2 denier for softness. Preferably, the second layer fibers are further treated to be permanently more hydrophilic than the first. The low denier fibers of the first layer have a higher capillary action than the fibers of the second layer. The nonwoven fabric optionally has $3^{rd}$, $4^{th}$, and other layers, as long as inclusion of other layers does not adversely affect the direction of flow of water vapor through the nonwoven fabric. In various embodiments, each layer is at least as hydrophilic as the one before it, measured in the direction from the surface being protected to the outside environment. In this way, the multilayer nonwoven fabric provides a one way path for moisture. The multilayer nonwoven fabric can also contain so-called neutral layers for strength. A neutral layer is one that is not necessarily more hydrophilic than its neighbor, but it is one with hydrophilic or wicking properties such that its presence in the multilayer fabric does not deleteriously affect water or vapor flow.

In preferred embodiments, the fibers can be made with masterbatch methods. In the first layer a polyethylene masterbatch contains the nucleating agent, the primary and secondary antioxidants, and the HALS. In second and subsequent layers, the masterbatch can further contain various agents that increase the hydrophilicity of the fibers, such as the noted hydrophilic titanates.

In subsequent fabric layers, if used, the masterbatch contains increasing amounts of the chemistry that provides the hydrophilic character. If the hydrophilic chemistry of subsequent layers is different from that of the second layer, then enough of the chemistry is added to the master batch to render each layer as hydrophilic, or preferably more hydrophilic, than the previous layer.

As noted, processes such as melt bonding create a "point of bond" that can more readily scratch a sensitive surface to be protected. Accordingly, it is preferred in some embodiments to form the nonwoven fabric by non-bonding processes such as needle punching and hydroentangling.

Hydrophilicity of a fiber or of a fabric or a single layer of a multilayer fabric made from the fiber is determined according to established methods. For example, hydrophilicity can be tested by applying drops of water to a fabric surface from a fixed height. The time required for the surface to be wetted by the droplet then provides information on the hydrophilicity of that fabric/fiber—the lower the wetting time, the more hydrophilic the fiber/fabric. As described for example in U.S. Pat. No. 4,073,993 one of the test methods is American Association of Textile Chemists and Colorists (AATCC) Standard Test Method 39-1971, Evaluation of Wettability. In the test, water droplets (15-25 drops per mL) are dropped every 5 seconds from a height of 3/8 in (1 cm) above the fabric. A stop watch is started from the time a drop falls. The wetting time is recorded as the time the water on the fabric loses its specular reflective power. An average of 10 droplets can be calculated. A faster wetting time equals to a higher level of hydrophilicity. Conveniently, the wetting test can be carried out on both sides of a multilayer fabric. Differing hydrophilicity is then indicated when the fabric has a faster wetting time on one side than on the other side.

2-Stage Nonwoven Construct with a Stitch Knit Non-Woven Porous Fabric Layer and an Applied Vapor Permeable Composition.

Figure 4:
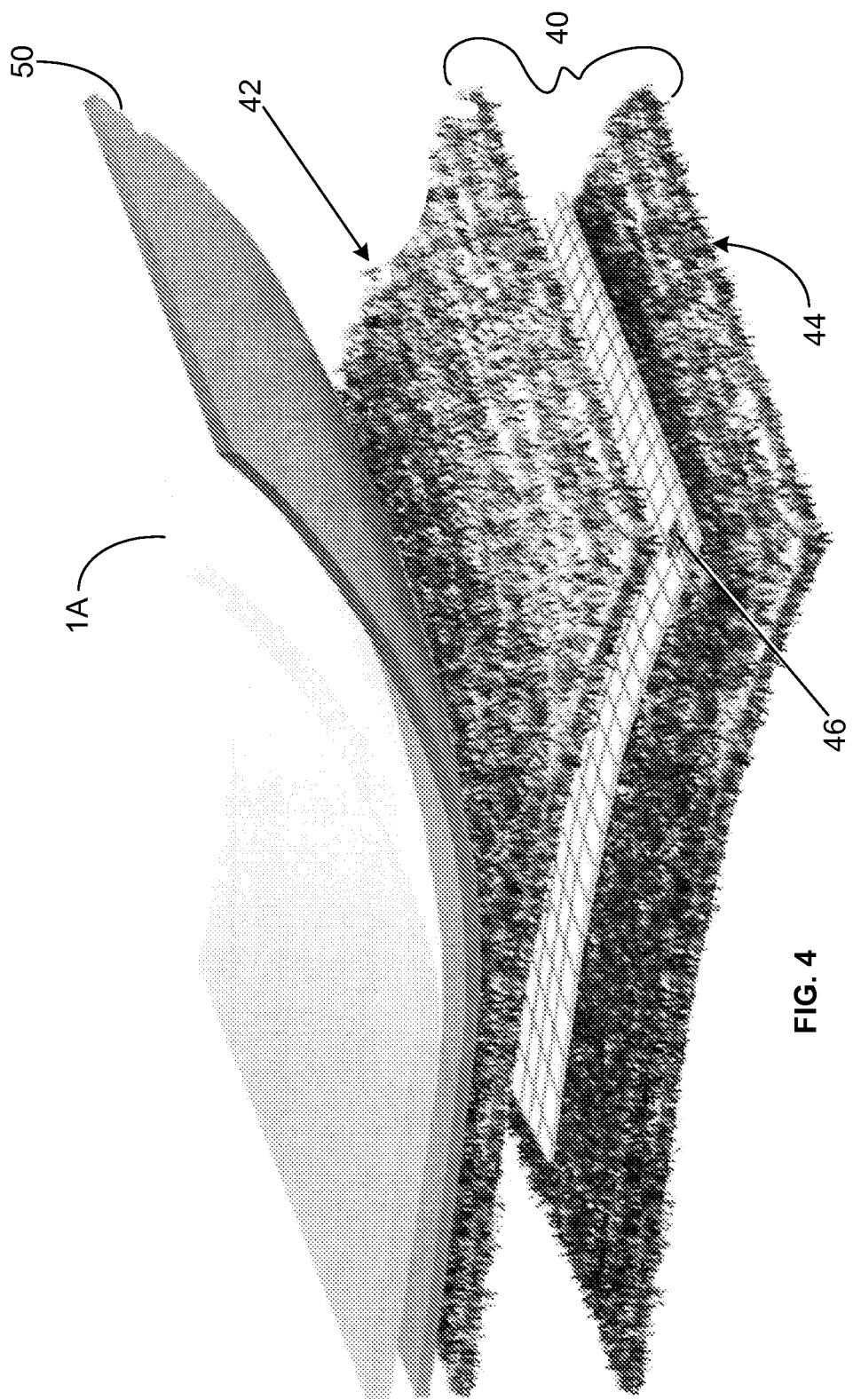
FIG. 4 is a partially separated perspective view showing the different layers of an alternative fabric construct according to the present invention.

An alternative embodiment of a fabric construct according to the teachings of the present invention is shown in FIG. 4. This fabric construct is made up of a vapor permeable waterproof polymeric coating 1A like that of FIG. 1. This polymer is coated on to a "stitch-knit" nonwoven structure 40 that is optionally already printed. Preferably the "stitch-knit" nonwoven 40 is coated with a VCI composition 50 prior to coating as shown in FIG. 4. The stitch knit nonwoven 40 is made of a layer 44 of first fibers having a smaller denier and lower hydrophilicity than the fibers in a second layer 42. A stitch knit fabric or scrim 46 is provided in the nonwoven 40 between the first layer 44 and second layer 42. Detailed explanation of the fabric construct will now be provided.

A special non-woven fabric is provided that is coated (by co-extrusion or by lamination, by way of non-limiting example) with a vapor permeable breathable film. In one version of the fabric construct, there is no adhesive and no flocking. Strength is provided by the special structure of the non-woven.

In one embodiment, the special non-woven is a strong entangled non-woven containing a stitch knit fabric as a reinforcement. The non-woven is further characterized by at least two layers of fibers having different hydrophilic and hydrophobic characteristics. The two layers of fibers are constructed around a stitch knit fiber with subsequent treatment such as by hydroentanglement or needle punch methods by non-limiting example.

To illustrate, the non-woven can be made by first carding a fiber of relatively low denier. After the first layer is carded, a stitch knit fabric is placed on top of the card. For purposes of the current description, a stitch knit fabric is characterized by a woven structure that is open or is characterized as a "loose" stitch, such that the distance between the threads of the weave is great enough to give the appearance of a netting rather than that of a closed knit fabric. For example, the distance between threads in the stitch knit fabric is about 0.5 to about 20 mm or about 1 to 10 mm. A spacing of about one eighth of an inch (about 3-4 mm) has been found to be particularly suitable.

After providing the stitch knit fabric in this way, a second card of fibers is then laid down on top of the stitch knit fabric followed by an entanglement process such as hydroentangling or needle punching. The second card consists of higher denier fibers than the first card. The smaller fibers of the first card tend to wick water and vapor quickly and are suitable for use on the side of the construct which in packaging use will face the surface of the object to be protected. Its wicking properties will act to quickly absorb vapor from the packaging volume. The second card in turn is disposed in use farther from the packaging volume but is physically connected to the first card of lower denier fibers. The larger fibers of the second card are more hydrophilic than the smaller fibers of the first card, and so are capable of taking the water vapor wicked by the first card and delivering it to a vapor permeable film applied to the second card side of the non-woven to form the construct of this embodiment.

Although making the special non-woven has been illustrated by laying down a first card of smaller denier fibers, it is to be understood it can just as well be made by carding the higher denier fibers first, followed by interposing a reinforcing knit fabric and subsequent carding of the smaller denier fibers followed by entangling. Whichever way the non-woven fabric is made, in use the lower denier fibers face the volume or part to be protected, as described further herein.

The non-woven is thus an entangled fabric made of layers of two different hydrophobicities (or equivalently of two different hydrophilicities), the whole thing being reinforced, for example by a stitch knit fabric, to provide strength. The material of the fibers and the stitch knit fabric is chosen so that the non-woven will have suitable strength and softness and so that the fibers can withstand the temperature of subsequent operations such as lamination or co-extrusion of the breathable polymer composition onto the non-woven.

Suitable fibers for the first and second card include polyester and nylon. Blends of fibers can be used, as well as combinations of natural and man-made fibers, as long as they maintain suitable properties at all times under the conditions of manufacture and use. The first card side of the non-woven, which in use faces the object to be protected, is advantageously soft because of the small denier fibers. Example polyester staple fibers that can be used in this application include Dacron® Plus, HydroPur Fiber, Delcron® Hydrotec Fiber and SteriPur® AM fibers from DAK Americas company. In order to provide a soft-to-touch surface it is preferred that the fibers used in this application are less than 10 deniers, and more preferably less than 2 deniers.

Likewise, the stitch-knit fabric contains threads and fibers made out of materials that can withstand all of the process steps. Suitable fibers include those of the first and second cards.

As noted, the fibers of the second card are more hydrophilic than those of the first card by virtue of their larger size. Advantageously, this enables the non-woven to transmit the vapor wicked by the first card through the second card and deliver it to the breathable film that is applied to the non-woven on the side of the second card. If desired, a difference in hydrophobicity/hydrophilicity can be achieved by providing a second card having fibers with additives that increase the hydrophilicity. An example of a suitable additive is the hydrophilic titanates discussed elsewhere for use in the adhesives of other embodiments of the construct.

So, the special non-woven is characterized by a first layer of fibers having a first hydrophilicity in contact with a second layer of fibers having a second hydrophilicity. In one embodiment, the structure is further characterized by a stitch knit fabric disposed between the first and second card fibers, providing reinforcement. The first and second fiber layers are in contact with one another by virtue of the fact that the fabric precursor made up of the card of the first fibers, the stitch knit fabric, and the card of the second fibers is subjected to an entanglement process such as hydroentangling. In this way, the fibers of the first card and of the second card are entangled around each other and around the stitch knit fabric. The entangled non-woven is then coated, on the side containing predominantly the second card fibers (i.e. the side with fibers of greater hydrophilicity), with a breathable, vapor permeable polymer composition. In use, the construct just described is applied with the non-woven facing the object to be protected, and more specifically the first card side with the smaller fibers facing the object to be protected.

In another embodiment, a two-stage non-woven is provided as above by carding a first layer of fibers, followed by carding a second layer, where the fibers of the two cards differ in hydrophobic of hydrophilic character. Instead of having a stitch knit fiber interposed between the cards as above, in an alternative embodiment the two cards can be lightly stitched, either before or after entangling. The two-stage non-woven is then provided with a vapor permeable polymeric film composition, as described above.

In another embodiment, the two-stage non-woven with reinforcing stitching made as described above is used as the porous fabric in the flocked constructs described further herein. In this embodiment the two-stage non-woven can be optionally printed. The fabric can be flocked before or after printing, and the flocked fabric can be provided with a vapor permeable polymer coating such as by laminating or co-extrusion.

Fire Resistant Fabric Constructs

The fabric constructs can be made fire resistant by adding known fire resistant additives to any of the constituent parts to impart a desired measure of protection against or resistance to fire. For example, additives can be added to the porous fabric, to the fibers making up the porous fabric, to the flocked fibers, to the flocking adhesive composition, and to the breathable (water vapor permeable) polymer coating. In this way, a fabric construct can keep a fire from spreading from its protected object and/or can protect the protected contents from a fire on the outside.

Fire retarding (FR) fabrics include those consisting of glass fibers (fiberglass) or other inorganic fibers (silica fibers, asbestos, and the like). Constructs containing organic and other flammable fabric can be rendered fire resistant or retardant by the use of intumescent adhesives such as acrylic, epoxy, melamine, or urethane intumescent coatings either in addition to, or as replacements for other adhesives such as those used to laminate a vapor permeable polymeric coating or to incorporate flocked fibers into the construct.

If desired, fire resistant flocking fibers such as fiberglass can be used in the fabric constructs described herein.

In a fire, the side of the fabric with the intumescent coating expands to create a char barrier. The char helps to protect against the conductive penetration of hot gasses and flames. It can also absorb smoke into its matrix, thus lowering by-products from the fire. It reduces the flame spread and helps to slow the fire's progress.

In an embodiment of a construct that keeps a fire from spreading, the fabric can be made of fiberglass and have an acrylic intumescent coating on one side of the fabric. The flocking adhesive can be applied over the intumescent adhesive and then flock can be applied to the flocking adhesive as described herein. The fabric is then coated with the highly breathable polymer on the opposite side from the flocking with a polymer make-up as described in FIG. 1. If fire were to occur inside the material, the flock fibers—facing the surface—and the flock adhesive would burn away and the intumescent coating would expand and form a char barrier, preventing the fire from escaping. The fiberglass fabric would help prevent the fire from breaking through and would not readily burn. It would also provide a refractory surface that helps prevent the heat from getting through.

In an embodiment of a construct that keeps a fire on the outside from damaging the protected contents, the porous fabric can be a fiberglass fabric and have an acrylic intumescent coating on one side of the fabric. Here, the flocking adhesive would on the fabric side opposite the intumescent and the flock would be applied into the flocking adhesive. The vapor permeable polymeric coating would be applied on the fabric side opposite the flocking, as usual. In use a cover made from the fabric construct would have the flocked fiber on the inside. In case of a fire on the outside, the intumescent coating would expand and form a char barrier preventing the fire from entering the cover. The fiberglass fabric would help prevent the fire from breaking through and would not readily burn. It would also provide a refractory surface that helps prevent the heat from getting through.

Example 1

Flocking a Porous Fabric

In a non-limiting example, a fabric construct is prepared as outlined here. The flocking fibers are 1.8 denier round semi-dull nylon 6,6 flock fiber that is 1 mm (39.37 mils) in length. The fiber density upon flocking in an illustrative embodiment is about 61 gsm (1.8 oz/sq yard or 0.1125 lbs/sq yard). The flocking operation as it takes place at Spectro Coating Corporation in Leominster, Mass. starts with a fabric—woven or nonwoven—that is preferably printed on one side. An adhesive pre-coat is then applied to the fabric on the side opposite the print. The adhesive pre-coat most preferably has a blow ratio of 5:1. The pre-coat, FF-3849 by Key Polymer, add on rate most preferably is about 0.5 oz/sq yard (0.031 lb/sq yard or 16.95 gsm). Following the application the pre-coat gets dried at 280° F. Upon drying the pre-coating seals the fabric on the applied side and acts as a primer between the fabric and the top coat, FF-3850 by Key Polymer, adhesive. The topcoat is applied on the same side as the pre-coat. The adhesive is foamed at a ratio of 1.60:1.00 and it is approximately 4 mils thick; with an add on rate of 3.20 oz/sq yard (0.2 lbs/sq yard or 108.50 gsm). The pre-coat and the topcoat optionally contain a static or dynamic antimicrobial composition.

After the top coat adhesive is applied, the fabric goes into the "flock chamber". Here the fabric is mechanically moved in an "up & down" format as it moves through the flock chamber. At the same time pre-cut flocking fibers are dropped into the "flock chamber" from hoppers. There are electrically charged metal bars placed across the width of the web. These charged metal bars constantly alternate the charge to align the fibers perpendicular to the moving fabric. The current flow on the metal bars is regulated by providing a voltage between 10,000 volts and 120,000 volts AC or DC.

As the fabric is mechanically moved up & down the fibers are pushed into the adhesive and they are stuck perpendicularly to the adhesive. Following the flocking process the fabric enters a drying oven where the adhesive is cured to set in place. At this stage the topcoat is dried at 250° F. and then cured and cross-linked at 320° F. The flock fibers are anchored into the adhesive to at least 10% of their overall length or in this case at about 0.10 mm (3.94 mils) deep. The flocking fibers are heat set at 405° F. During such application the adhesive pre-coat, adhesive top coat or both layers, may have Vapor corrosion inhibitors. The preferred VCI add on rate in the top coat adhesive is about 2% by weight. In this example there would be about 2.17 grams of active VCI chemistry and about 1% by weight titanate or zirconate coupling agents that renders the adhesive more hydrophilic.

The thickness of the adhesive is ideal for the addition of VCI and titanate to work in synergy with the whole system to remove moisture and provide corrosion inhibitors into the macro environment of the packaging.

Example 2

The flocked fabric of Example 1 is extrusion coated by a 3 mil thick mono-layer polymer blend that is made up of, by non limiting example, 50% Elvaloy™ AC 1224, 40% Entira™ Breathe and 10% Fusabond™ FB556 by polymer weight, plus a weathering package as within the ranges given in Table 1 above.

The extrusion process settings were; melt temperature at 473° F., Chill Roll at 75° F., nip roll at 100 psi, corona treatment at 5 kW and line speed of 75 feet per minute.

Example 3

Application of polyurethane vapor permeable polymer composition. Another example of a fabric construct has a polyurethane vapor permeable coating on two layers of primer adhesive bonded to a polyester porous fabric, where the fabric is further coated with another two layers of adhesive on the opposite side and flocked. The urethane coating formulation is provided in Table 2 above.

First a Polyester fabric with a twill pattern similar to the one in Example 1 is coated at room temperature by two passes of acrylic primer, FF-3841 supplied by Key Polymer, at a 5:1 foam ratio. About 0.5 oz/sq yard is applied on each pass.

The primed fabric is then coated with polyurethane, FL-1910 supplied by Key Polymer, at 3.25 oz/sq yard. It is then treated at a temperature of 340° F. The temperature increase from ambient is gradual. If a clear top coat is desired FL-1916 grade could be used.

If the polyurethane coating is not fully cured at this point, it is ok, because the construct will be run it through the machine again when flocking at the same temperatures. It should cure fully during the second pass. All the coatings, primer, adhesive and polyurethane are applied with knife over roll method. All the products are water based and pumped from drums at room temperature.

Now the porous fabric with the highly breathable polyurethane coating is ready for the flocking operation. In this working example a suitable type of flock fiber is a 1.5 denier PET that is 30 mils in length, produced by Palmetto Synthetics LLC, from South Carolina.

First a water based acrylic latex pre-coat and topcoat adhesive layer similar to the one in Example 1 with encapsulated VCI powder is applied. Then the fabric goes through the flocking chamber where electrically charged fibers are applied as in Example 1. Following the flocking process the fabric enters a drying oven where the adhesive is cured to set in place. At this stage the topcoat is dried at 250° F. and then cured and cross-linked at 320° F. The flock fibers are anchored into the adhesive to at least 10% of their overall length or in this case at about 0.10 mm (3.94 mils) deep. The flocking fibers are heat set at 405° F. Since the breathable coating was already applied, the fabric is ready for use.

Example 4

The fabric construct in this example is made by having a highly breathable polyurethane coating on one side of a porous woven fabric, a non-pressure sensitive rubber hot melt containing vapor corrosion inhibitors on the opposite side of the polyurethane coating, two layers of foamed acrylic latex adhesive applied on top of the hot melt adhesive, and flocked fibers applied on top of the acrylic latex adhesive and cured.

Onto a polyester fabric with a twill pattern as in Examples 1 and 3, there is applied an acrylic primer followed by a polyurethane with the formulation as in Table 2. Non-pressure sensitive hot melt adhesive compounded with vapor corrosion inhibitors is applied to the opposite side of the polyurethane coating. The hot melt fit for such VCI compounding and fabric application is a product available by Adherent Laboratories Inc in Saint Paul, Minn. The product is called Affix™ AL-2007[1]. The hot melt adhesive is applied by melting the adhesive at 325 degrees F. and pumping it through a manifold that feeds the spray nozzles. The spray nozzles with use of hot air turn the applied adhesive into a continuous fiber. This method is also called melt-blown. The air temperature that helps to create a random adhesive pattern is at 400 degrees F. The application takes place at 300 feet per minute. The hot melt application equipment that can be used in this example can be found at Tufco Technologies Inc. in Green Bay, Wis. The application can be between 3 gsm and 25 gsm, but 13 gsm is preferred for this application. The coated fabric is then laminated to a release liner to protect the adhesive. A suitable release liner is on a 60 pound poly-coated paper style 60#C1S BPE manufactured by Enterprise Coated Products in IL. Before the flocking operation, the release liner is peeled off and water based acrylic latex adhesive, for example FF-3841 supplied by Key Polymer, pre-coat and topcoat—both foamed—is applied as mentioned in Examples 1 and 2. Since the vapor corrosion inhibitors are in the hot-melt adhesive neither the pre-coat nor the topcoat adhesive contains vapor corrosion inhibitors in this application. Following the top coat the polyester flock fibers are applied and the product is cured by means of heat application as mentioned in Examples 1 and 3.

Example 5

Tear Strength Measurements

To illustrate that the vapor permeable coating compositions lead to improved (increased) tear strength, four fabric or construct samples were subject to Elmendorf tear strength measurements in the filling (CD) and warp (MD) directions:

5a is a 3×1 twill PET plain fabric with no flocking and no coating;
5b is the fabric of 5a with flocked nylon fibers, but before any vapor permeable coating is applied;
5c is the flocked fabric of 5b with an ionomer coating as the vapor permeable coating composition; and
5d is the flocked fabric of 5b with an applied polyurethane coating as the vapor permeable polymer composition.

Samples 5c and 5d represent fabric constructs of the current invention. Tear strength test results are given in Table 3. Each value is the average of 5 sample measurements.

TABLE 3

Tear strengths of fabrics and fabric constructs.

| Example | Tear strength, lbs. (grams), filling direction | Tear strength, lbs.(grams), warp direction | Comments |
| --- | --- | --- | --- |
| 5a | 26.1 (11,849) | 27.9 (12,667) | plain 3 × 1 PET twill fabric |
| 5b | 9.32 (4,231) | 17.5 (7945) | 5a with nylon flocked fibers |
| 5c | 30.67 (13,910) | 21.5 (9,754) | 5b with ionomer coating |
| 5d | 28.01 (12,718) | 23.55 (10,690) | 5b with polyurethane coating |

The data in Table 3 demonstrate that flocking a porous fabric lowers the tear strength, and that adding a vapor permeable compositions increases the tear strength of the flocked constructs of the invention to a level comparable to that of the unflocked and uncoated fabric.

We claim:

1. A fabric construct comprising:
a porous fabric layer;
an adhesive layer applied to said fabric layer including an adhesive comprising an antimicrobial compound chemically bonded to a vapor corrosion inhibitor;
a fiber layer applied to the adhesive layer; and
a waterproof, moisture vapor permeable polymeric composition comprising a cross-linked polyurethane coating applied to and embedded in the porous fabric on the side opposite the fiber layer without an adhesive binding said composition coating to said porous fabric;
wherein the fiber layer comprises flocked fibers or a non-woven fabric.

2. The fabric construct of claim 1 wherein the porous fabric layer is a woven material.

3. The fabric construct of claim 1 wherein the adhesive layer is formed from a foamed hydrophilic adhesive composition selected from the group consisting of acrylic latexes, urethanes, and epoxies.

4. The fabric construct of claim 2 wherein the porous fabric layer is marked with a design, and the waterproof, moisture vapor permeable polymeric composition cross-linked coating is clear to make the design visible.

5. The fabric construct of claim 3 wherein the adhesive composition comprises encapsulated vapor phase corrosion inhibitors.

6. The fabric construct of claim 4 wherein the adhesive composition is modified with titanates and/or zirconates.

7. The fabric construct of claim 1 wherein said adhesive layer comprises a foamed adhesive layer.

8. The fabric construct of claim 1 wherein said adhesive layer is obtained by applying multiple coats.

9. The fabric construct of claim 1 wherein the fiber layer comprises flocked fibers selected from rayon, acetate, nylon, polyolefin, acrylic, polyester, carbon fiber, cotton, hemp, and wool.

10. The fabric construct of claim 9 wherein said flocked fibers have an average denier of between 0.5 and 90.0.

11. The fabric construct of claim 9 wherein said flocked fibers have an average length between 0.25 mm and 20.0 mm.

12. The fabric construct of claim 9 wherein said flocked fibers are capable of wicking moisture in the direction of the porous fabric layer.

13. The fabric construct of claim 1 wherein the moisture vapor permeable polymeric composition forms a layer having an average thickness of 0.5 mil to 10 mils.

14. The fabric construct of claim 1 wherein the moisture vapor permeable polymeric composition forms a layer having a water vapor transmission rate of at least 100 grams/square meter/day at 37.8° C. and 100% relative humidity.

15. The fabric construct of claim 1, wherein at least one of the porous fabric of the fabric layer, the adhesive composition of the adhesive layer, the fiber layer, and the vapor permeable polymeric composition comprises a fire resistant additive.

16. The fabric construct of claim 1, wherein the fiber layer comprises flocked fibers.

17. The fabric construct of claim 1, wherein the fiber layer comprises a non-woven fabric.

18. The fabric construct of claim 1, wherein the adhesive layer comprises a foamed adhesive composition.

19. The fabric construct of claim 1, wherein the adhesive layer comprises a composition rendered hydrophilic by incorporation of titanate or zirconate compounds having hydrophilic properties.

20. The fabric construct of claim 1, wherein the vapor permeable polymeric composition further comprises a flattening agent.

21. A fabric construct according to claim 1, wherein the adhesive comprises hexamethylenetetramine.

22. A waterproof protective cover that provides for water vapor to escape through the cover from a protected volume enclosed by the cover, formed from a fabric construct according to claim 1.

23. A waterproof protective cover that provides for water vapor to escape through the cover from a protected volume enclosed by the cover, formed from a fabric construct according to claim 16.

24. A protective cover prepared by sewing or thermoforming a fabric construct according to claim 1.

25. A method for making a fabric construct according to claim 16, comprising:
applying a coating of aliphatic polyurethane on one side of a porous fabric;
applying a foamed adhesive composition to the side of the porous fabric opposite the polyurethane coating; and
applying flocked fibers to the foamed adhesive composition.

26. A method according to claim 25, wherein applying the foamed adhesive composition comprises applying a pre-coat and a topcoat, wherein the pre-coat and the topcoat comprise vapor phase corrosion inhibitors (VCI) and a coupling agent selected from titanates and zirconates.

27. A method for making a construct according to claim 1, comprising:
   applying a hot melt adhesive composition to one side of a porous fabric, wherein the hot melt adhesive composition comprises a non-pressure sensitive thermoplastic hot melt rubber and vapor phase corrosion inhibitor (VCI);
   applying a foamed adhesive composition onto the adhesive composition comprising the thermoplastic hot melt rubber;
   applying flocked fibers onto the foamed adhesive composition; and
   applying the vapor permeable polymer composition onto the porous fabric on the side opposite the adhesive and the flocked fibers.

28. A method according to claim 27, wherein the hot melt adhesive composition comprises a hot melt block rubber.

29. A method according to claim 28, wherein the foamed adhesive composition is selected from acrylic latexes, urethanes, and epoxies.

30. A method for making a construct according to claim 16, comprising:
   applying a vapor permeable polyurethane composition onto one side of a porous fabric;
   applying a non-pressure sensitive hot melt block rubber composition comprising VCI onto the side of the porous fabric opposite the polyurethane coating;
   applying a foamed adhesive composition onto the adhesive composition comprising the thermoplastic hot melt rubber; and
   applying flocked fibers onto the foamed adhesive composition.

31. A method of making a construct according to claim 17 comprising; applying a coating of aliphatic polyurethane on one side of the porous fabric; applying a hot melt adhesive composition to the side of the porous fabric opposite the polyurethane, wherein the hot melt adhesive composition comprises a pressure sensitive thermoplastic hot melt rubber and vapor phase corrosion inhibitor (VCI); and
   adhering the non-woven fabric to the hot melt adhesive composition.

32. A method of making a construct according to claim 17 by lamination, the method comprising:
   applying a coating of aliphatic polyurethane on one side of a porous fabric to make a first lamination part;
   applying a layer of adhesive to one side of a non-woven fabric to make a second lamination part; and
   forming the construct by laminating the porous fabric side of the first to the adhesive side of the second part.

* * * * *